US009676896B2

(12) United States Patent
Mooney et al.

(10) Patent No.: US 9,676,896 B2
(45) Date of Patent: *Jun. 13, 2017

(54) SUGAR-BASED POLYURETHANES, METHODS FOR THEIR PREPARATION, AND METHODS OF USE THEREOF

(71) Applicant: Innovative Urethane, LLC, Spring, TX (US)

(72) Inventors: Joseph Mooney, Dubuque, IA (US); Thomas Rathke, Bluffton, SC (US); Jose Luna, Pasadena, TX (US); Douglas Svenson, Pooler, GA (US)

(73) Assignee: INNOVATIVE URETHANE, LLC, Spring, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/193,156

(22) Filed: Feb. 28, 2014

(65) Prior Publication Data

US 2014/0179814 A1    Jun. 26, 2014

Related U.S. Application Data

(63) Continuation-in-part of application No. 13/562,211, filed on Jul. 30, 2012.

(60) Provisional application No. 61/513,530, filed on Jul. 29, 2011.

(51) Int. Cl.
| | |
|---|---|
| *C08L 23/06* | (2006.01) |
| *C08K 3/00* | (2006.01) |
| *C08K 5/00* | (2006.01) |
| *C08G 18/32* | (2006.01) |
| *C08K 5/521* | (2006.01) |
| *C08G 18/66* | (2006.01) |
| *C08G 18/76* | (2006.01) |
| *C08G 18/18* | (2006.01) |
| *C08G 101/00* | (2006.01) |

(52) U.S. Cl.
CPC ......... *C08G 18/3218* (2013.01); *C08G 18/18* (2013.01); *C08G 18/1833* (2013.01); *C08G 18/3275* (2013.01); *C08G 18/6677* (2013.01); *C08G 18/7664* (2013.01); *C08K 3/0033* (2013.01); *C08K 5/521* (2013.01); *C08G 2101/005* (2013.01); *C08G 2101/0008* (2013.01); *C08G 2101/0083* (2013.01)

(58) Field of Classification Search
CPC .............................. C08G 18/30; C08G 18/3203
See application file for complete search history.

(56) References Cited

U.S. PATENT DOCUMENTS

| | | | |
|---|---|---|---|
| 3,909,464 A * | 9/1975 | Anorga | C08G 18/7607 521/114 |
| 4,066,578 A * | 1/1978 | Murch | C08G 18/4833 521/108 |
| 4,286,004 A | 8/1981 | Dahmen et al. | |
| 4,400,475 A † | 8/1983 | Kennedy | |
| 4,404,294 A | 9/1983 | Wiedermann | |
| 4,417,998 A | 11/1983 | Kennedy | |
| 4,481,308 A | 11/1984 | Gray | |
| RE31,757 E | 12/1984 | Kennedy | |
| 4,511,688 A | 4/1985 | Termine et al. | |
| 4,515,638 A | 5/1985 | Kennedy | |
| 4,520,139 A | 5/1985 | Kennedy | |
| 4,521,544 A | 6/1985 | Kennedy | |
| 4,530,777 A | 7/1985 | Kennedy | |
| 4,629,768 A | 12/1986 | Hire et al. | |
| 4,654,375 A | 3/1987 | Malwitz | |
| 5,192,813 A * | 3/1993 | Henn | C08G 18/4816 521/159 |
| 5,248,703 A | 9/1993 | Krueger et al. | |
| 5,268,393 A | 12/1993 | Blount | |
| 5,614,566 A | 3/1997 | Burkhart et al. | |
| 5,668,378 A * | 9/1997 | Treboux | C08G 18/4072 252/182.26 |
| 5,690,855 A | 11/1997 | Nichols et al. | |
| 5,789,915 A | 8/1998 | Ingraham | |
| 5,844,012 A | 12/1998 | Petrella et al. | |
| 5,854,309 A | 12/1998 | Blount | |
| 5,876,813 A | 3/1999 | Bambara et al. | |
| 5,895,792 A * | 4/1999 | Rotermund et al. | 521/131 |
| 6,258,298 B1 | 7/2001 | Blount | |

(Continued)

FOREIGN PATENT DOCUMENTS

| | | |
|---|---|---|
| EP | 1162222 A2 | 12/2001 |
| EP | 1 942 123 | 7/2008 |
| EP | 2 196 493 | 6/2010 |
| EP | 2196493 † | 6/2010 |
| WO | 01/70842 A2 | 9/2001 |
| WO | WO2004005365 † | 1/2004 |
| WO | WO2014021827 † | 2/2014 |

OTHER PUBLICATIONS

Jung, T.K., International Search Report for International Patent Application No. PCT/US2012/048885, dated Mar. 25, 2013, Korean Intellectual Property Office.

(Continued)

*Primary Examiner* — Liam J Heincer
(74) *Attorney, Agent, or Firm* — Eversheds Sutherland (US) LLP

(57) ABSTRACT

Polyurethane foams which are highly flame resistant are described, as well as the production of such polyurethane foams by the reaction between a natural polyol, such as sucrose or a blend of mono- or disaccharides in place of the standard hydrocarbon-based polyol component, a polyisocyanate and water in the presence of a suitable polyurethane forming catalyst and a non-halogenated flame retardant, and optionally one or more components such as surfactants and/or emulsifiers. The resultant polyurethane foam has a bio-based solid content ranging from about 17% to 30%, may be formulated in a variety of foam densities for a variety of applications, and exhibits a high degree of fire and burn resistance, as exhibited by the flame spread index, flash over resistance determination, and the smoke spread values.

15 Claims, 9 Drawing Sheets

(56) References Cited

U.S. PATENT DOCUMENTS

| | | | |
|---|---|---|---|
| 6,288,133 B1* | 9/2001 | Hagquist | C08G 18/36 |
| | | | 156/77 |
| 6,322,743 B1* | 11/2001 | Stroobants | C08G 18/3848 |
| | | | 264/321 |
| 6,444,718 B1* | 9/2002 | Blount | C08G 18/3831 |
| | | | 252/607 |
| 6,555,645 B1 | 4/2003 | Ikeda et al. | |
| 6,846,849 B2 | 1/2005 | Capps | |
| 7,129,291 B2 | 10/2006 | Blount | |
| 7,151,121 B2 | 12/2006 | Nichols et al. | |
| 7,160,930 B2 | 1/2007 | Sparks et al. | |
| 7,465,757 B2 | 12/2008 | O'Connor et al. | |
| 7,872,055 B2 | 1/2011 | Burdeniuc et al. | |
| 8,084,523 B2 | 12/2011 | Lopez et al. | |
| 2002/0040072 A1 | 4/2002 | Lockwood | |
| 2003/0083394 A1* | 5/2003 | Clatty | C08G 18/36 |
| | | | 521/155 |
| 2004/0082712 A1 | 4/2004 | Blount | |
| 2004/0157945 A1 | 8/2004 | Barber | |
| 2005/0043816 A1* | 2/2005 | Datta | A61L 27/18 |
| | | | 623/23.61 |
| 2005/0165124 A1 | 7/2005 | Brown | |
| 2006/0014846 A1 | 1/2006 | Sparks et al. | |
| 2006/0235098 A1 | 10/2006 | Burdeniuc et al. | |
| 2006/0270747 A1* | 11/2006 | Griggs | 521/172 |
| 2007/0112085 A1 | 5/2007 | Tokumoto et al. | |
| 2008/0207787 A1* | 8/2008 | Clatty | C08G 18/4018 |
| | | | 521/131 |
| 2008/0242822 A1 | 10/2008 | West | |
| 2009/0143495 A1 | 6/2009 | Nozawa et al. | |
| 2009/0156704 A1* | 6/2009 | Stowell | C08J 9/0038 |
| | | | 521/160 |
| 2009/0197983 A1 | 8/2009 | Vo et al. | |
| 2010/0101165 A1 | 4/2010 | Buffy et al. | |
| 2010/0113632 A1 | 5/2010 | Sjerps et al. | |
| 2010/0158849 A1 | 6/2010 | Khatri et al. | |
| 2010/0159232 A1 | 6/2010 | Kim et al. | |
| 2010/0174006 A1 | 7/2010 | Gilder et al. | |
| 2010/0317760 A1 | 12/2010 | Tanguay et al. | |
| 2012/0239161 A1 | 9/2012 | Datta et al. | |
| 2012/0244303 A1* | 9/2012 | Tomasi | C08G 18/6607 |
| | | | 428/36.5 |
| 2013/0030067 A1† | 1/2013 | Mooney | |
| 2014/0275305 A1* | 9/2014 | Svenson | C08G 18/4883 |
| | | | 521/117 |
| 2015/0322195 A1* | 11/2015 | Makida | C08J 9/144 |
| | | | 521/103 |

OTHER PUBLICATIONS

Jung, T.K., Written Opinion for International Patent Application No. PCT/US2012/048885, dated Mar. 25, 2013, Korean Intellectual Property Office.

Donnelly, M.J., Stanford, J.L., and Still, R.H., "The Conversion of Polysaccharides into Polyurethanes: A Review", Carbohydrate Reformers, vol. 14, pp. 221-240, 1991.

Lin, Y., Hsieh, F., and Huff, H.E., "Water-Brown Flexible Polyurethane Foam Extended with Biomass Materials", Journal of Applied Polymer Science., vol. 65, pp. 695-703, Jul. 1997.

Marin, R., De Paz, M.V., Ittobane, N., Galbis, J.A. and Munoz-Guerra, S., "Hydroxylated Linear Polyurethanes Derived from Sugar Alditols", Macromolecular Chemistry and Physics, vol. 210, Issue 6, pp. 486-494, Mar. 2009.

Marin R. and Munoz-Guerra, S., "Linear Polyurethanes Made from Threitol: Acetalized and Hydroxylated Polymers", Journal of Polymer Science: Part A: Polymer Chemistry, vol. 46, pp. 7996-8012, 2008.

Supplementary European Search Report dated Jan. 27, 2015 for Application No. EP 12881531.

Donnelly, M. J. et al., "Review Paper—The Conversion of Polysaccharides into Polyurethanes: A Review," Carbohydrate Polymers 14 (1991) 221-240.

Lin, Y. et al., "Water-Blown Flexible Polyurethane Foam Extended with Biomass Materials," Departments of Biological and Agricultural Engineering and Food Science and Human Nutrition, University of Missouri, Columbia, Missouri 65211, Received Nov. 1, 1996; Accepted Nov. 22, 1996, pp. 695-703.

Marin, Romina et al., "Hydroxylated Linear Polyurethanes Derived from Sugar Alditols," Macramel. Chem. Phys. 2009, 210, 486-494.

Marin, Romina et al., "Linear Polyurethanes Made from Threitol: Acetalized and Hydroxylated Polymers," Journal of Polymer Science: Part A: Polymer Chemistry, vol. 46, 7996-8012 (2008).

International Search Report and Written Opinion, dated Mar. 25, 2013, of corresponding International patent application No. PCT/US2012/048885, filed Jul. 30, 2012.

US Patent Office; Rejection from Prosecution History of U.S. Patent Publication No. 20130030067; Notification date Mar. 26, 2014.†

* cited by examiner
† cited by third party

| Example<br>Property | Ex. 1 | Ex. 5 | SEALECTION® 500 | SEALECTION Agribalance® | Foam-Lok™ FL 500 | Icynene LD-C-50® |
|---|---|---|---|---|---|---|
| Density (core)[1] | 1 lb/ft³ | 0.5 lb/ft³ | 0.45-0.5 lb/ft³ | 0.6-0.8 lb/ft³ | 0.4-0.6 lb/ft³ | 0.5 lb/ft³ |
| Thermal Resistance (R-value per inch)[2] | 5.1 | 3.7 | 3.81 | 4.45 | 3.9 | 3.7 |
| Tensile strength[3] | 3.33 psi | 6.5 psi | 5.6 psi | 3.87 psi | 3 psi | Not given |
| Open cell content[4] | 98.1% | 97.9% | | 98% | >94% | |
| Surface burning Characteristics (4-6" thick)<br>• Flame spread index[5]<br>• Smoke developed | Class I<br>15 @ 4"<br>≤400 @ 4" | Class I<br>5 @ 4"<br>≤450 @ 4" | Class I<br>21 @ 6"<br>216 @ 6" | Class I<br>15-20 5-6"<br>400 @ 5-6" | Class I<br>≤25<br>≤450 | Class I<br>≤25<br>≤450 |
| Dimensional stability[6] | <5% | <15% | Not given | 3.16% | 3% | Not given |
| Air leakage[7] | <0.01 L/s-m² | <0.01 L/s-m² | 0.001 L/s-m² | 0.003 L/s-m²@ 3.5" | <0.02 L/s-m²@ 4.5" | 0.009 L/s-m² @ 75 Pa for 3.5" |
| Bio content[8] | 25% | 17% | Not given | Not given | Not given | Not given |
| Fungus growth[9] | 0 | 0 | Not given | Not given | Not given | Pass[10] |

FIG. 9

SUGAR-BASED POLYURETHANES, METHODS FOR THEIR PREPARATION, AND METHODS OF USE THEREOF

CROSS REFERENCE TO RELATED APPLICATIONS

This application is a continuation-in-part application of U.S. patent application Ser. No. 13/562,211, filed Jul. 30, 2012, which claims benefit and priority to U.S. Provisional Patent Application Ser. No. 61/513,530, filed Jul. 29, 2011, and U.S. Provisional Patent No. 61/381,343, filed Sep. 9, 2010, all of which are incorporated herein in their entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to polyurethanes and their manufacture, and more specifically, are related to methods for the manufacture of polyurethane foams of a variety of densities and which use sugars as the primary source of the polyol component.

Description of the Related Art

Polyurethane foams articles are used extensively in a wide array of commercial and industrial applications. The popularity of polyurethane foam articles is due in part to the fact that the physical properties of a polyurethane foam article may be selectively altered based on the formulation of reactants which form the polyurethane foam article. The formulation may be developed to provide a polyurethane foam article that is soft, flexible and open-celled which can be used in applications such as seat cushions. On the other hand, the formulation may be developed to provide a polyurethane foam article that is rigid, structural, thermally resistant and closed-celled and which therefore can be used as thermal insulation panels.

The most common method of forming polyurethane foam articles is the mixing and, subsequent reaction, of a polyol (e.g. a resin composition) with an isocyanate in the presence of a blowing agent. Generally, when the resin composition is mixed with the isocyanate to form a reaction mixture in the presence of the blowing agent, a urethane polymerization reaction occurs. As the urethane polymerization reaction occurs, the reaction mixture cross-links to form the polyurethane and gas is liberated. Through the process of nucleation, the gas foams the reaction mixture thereby forming voids or cells in the polyurethane foam article.

The resin composition typically comprises one or more polyols, a cell opening agent, a cross linking agent, a catalyst, an adhesion promoting agent and various additives. The blowing agent creates the cells in the polyurethane foam article as described above. The cell opening agent helps open the cells so that the cells form an interconnected network and improves the stability of the polyurethane foam article. The cross-linking agent promotes cross-linking of the reaction mixture which results in the polyurethane foam article. The catalyst controls reaction kinetics to improve the timing of the polymerization reaction by balancing a gel reaction and the blowing agent to create the polyurethane foam article, which is stable. Other additives, such as adhesion promoting agents (e.g. an aprotic solvent), may be added to the formulation in order to facilitate wet out of the reaction mixture and promotes adhesion of the polyurethane foam article to substrates upon which the polyurethane foam article is disposed. For example, the substrate may be a thermoplastic shell or thermoplastic liner of a picnic cooler. The density and rigidity of the polyurethane foam article may be controlled by varying the chemistry of the isocyanate, the resin composition and/or the blowing agent, and amounts thereof. Other additives that are often included within the polyurethane foam product are fire retardants, typically halogenated—(e.g., brominated and chlorinated materials) and/or phosphorus-containing retardant materials.

Plastic foams have been utilized as thermal insulating materials, light weight construction materials, and flotation materials and for a wide variety of other uses because of their excellent properties. Until recently, their use has been somewhat limited in environments where there is danger of fire because of their substantial fuel contribution, their contribution to rapid flame spread and the fact that they generate large quantities of noxious smoke on thermal decomposition when burned or heated to an elevated temperature. This has limited the commercial development of plastic foams, and large amounts of money and much research time have been expended in attempts to alleviate these problems.

With the present interest in conserving heating fuel, many existing buildings are installing additional insulation, and newly constructed buildings are including more insulation than was formerly used.

A previously common type of foam insulation for existing structures are urea formaldehyde foams, which are foamed in place between the outside wall and the inside wall of the structure, with or without additional, fiberglass insulation. Fiberglass insulation alone can be considered to be porous in nature since it is generally a mat of fine glass fibers, which can contribute to lower insulation values by allowing air circulation within the walls. Foam insulations, however, form an air barrier between the interior and exterior walls of a structure, and thus form a generally impervious barrier to air circulation, thereby making them better insulation materials. Unfortunately, the urea formaldehyde foam that has been used spontaneously decomposes, releasing formaldehyde fumes in quantities which may be toxic. The use of urea formaldehyde foams in construction is prohibited in many building codes for this reason.

Another type of material often used for insulation is polyurethane foam. However, polyurethane foam provides a substantial fuel contribution, spreads flame rapidly, and releases toxic gases including carbon dioxide, carbon monoxide and hydrogen cyanide when burned. Additionally, conventional polyurethane foam articles are made from petroleum-based polyol. As a non-renewable feedstock, petroleum has both environmental and financial drawbacks. Accordingly, there are environmental, economic, and commercial advantages associated with the use of polyols based on renewable feedstocks such as natural oils to make what some term "bio-based" polyurethane foam articles.

Rigid polyurethane foams are generally prepared by reacting an polyisocyanate with a polyol. For most commercial purposes, the reaction is conducted in the presence of a foaming agent, surfactant, catalyst and possibly other ingredients. In order to reduce the cost of preparing these foams, efforts have been made to employ polysaccharides such as starch or cellulose as a polyol reactant in their preparation.

The use of such alternative polyol materials has been unsatisfactory to date because of the poor physical properties of the foams produced unless they have been modified in some way. For example, oxyalkylated starch yields satisfactory foams, but the direct oxyalkylation of starch results in uncontrolled degradation or decomposition of the starch. When such products are used in the production of foams, the foams do not have uniform chemical or physical properties.

The inventions disclosed and taught herein are directed to polyurethane foams using natural or plant-based polyols, such as sucrose, for the polyol component in the foam composition, wherein the resultant foams exhibit a high degree of burn resistance, and a high bio-based measurement, indicating that the product has a very high green value'" rating according to ASTM standards.

BRIEF SUMMARY OF THE INVENTION

Fire retardant polyurethane foams, as well as products for their production, using natural or plant-based polyols as the major polyol component are described. In one aspect of the disclosure, polyurethane foams which have a high 'green value' and which exhibit a high degree of burn resistance are described, wherein the foams include a plant-based polyol, such as sucrose, as the polyol component, a blowing agent, and a flame retardant (FR) to impart flame resistance to the foams produced.

In accordance with a first embodiment of the present disclosure, a substantially hydrocarbon-free flame-retardant polyurethane foam made by reacting together a first and second reaction mixture is described, the first and second reaction mixtures comprising a natural polyol wherein substantially all of the hydroxyl groups on the polyol are free; an isocyanate; a surfactant; a blowing agent such as water or other suitable blowing agents; a polyurethane producing catalyst; and a flame retardant or plasticizer. In certain aspects of this embodiment, the natural polyol is sucrose, an invert solution, molasses, or a combination thereof.

In accordance with a further embodiment of the present disclosure, a method of making a flame-retardant polyurethane foam is described, the method comprising (a.) mixing an untreated natural polyol in which substantially all of the hydroxyl groups are free, a surfactant, a polyurethane forming catalyst, and water to form a first aqueous solution; (b.) adding to the first aqueous solution mixture a second solution containing a polyisocyanate; and (c.) allowing the mixture to foam.

In accordance with yet another embodiment of the present disclosure, a method for preparing a water blown, low density, polyurethane foam, is described, the method which comprises contacting at least one polyisocyanate with at least one natural polyol in an amount from about 20 wt. % to about 70 wt. %, at an Isocyanate Index of 10 to 120, more preferably at an Index between 20 to 50, in the presence of a blowing agent composition comprising at least 2 wt. % water, preferably at least about 5 wt. % water, and an effective amount of a catalyst composition comprising a gelling catalyst and a blowing catalyst, the foam having a density ranging from 0.3 lb/ft$^3$ to 5 lb/ft$^3$ (6 Kg/m$^3$ to 80 Kg/m$^3$), inclusive, such as density ranges from about 0.3 lb/ft$^3$ to about 1.0 lb/ft$^3$. In further accordance with aspects of this embodiment, the natural polyol is sucrose, invert, molasses, a carbohydrate, or a combination thereof, and provides an open-cell foam with a low compressive strength, and good tensile strength.

In accordance with further aspects of the present disclosure, a composition for preparing polyurethane foam is described, the composition comprising an A-side component comprising one or more isocyanates, and a B-side component comprising between 20 to about 70 wt. % of natural polyol, between about 0.5 wt. % and 10 wt. % water, a surfactant in an amount between about 1.0 wt. % and about 5 wt. %, between about 0.05 to about 10 wt. % of a blowing catalyst, from about 0.5 wt. % to about 5 wt. % of a chain extender, an amine catalyst in an amount from about 0.01 wt. % to about 10 wt. %, a plasticizer in an amount ranging from about 0.01 wt. % to about 15 wt. %, and a fire retardant in an amount ranging from about 5 wt. % to about 40 wt. %, and wherein the volume ratio of A-side component to B-side component is between about 1.0 and 5.0.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 9 illustrates a comparative chart of foam products in accordance with the present disclosure, in comparison with several commercially available products.

Figure 1:
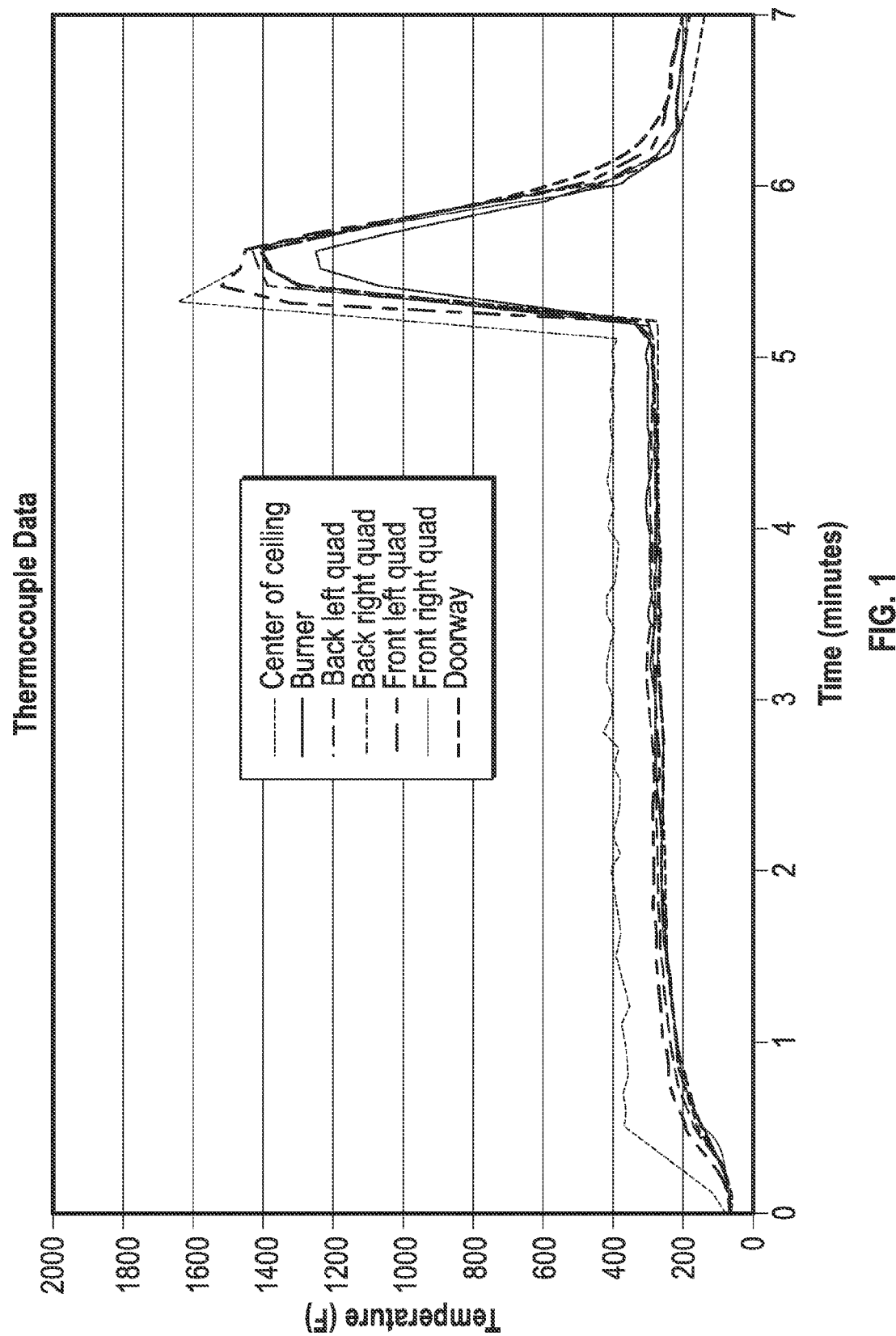
FIG. 1 illustrates a graph of exemplary thermocouple data from an ICC-ES AC377 flame test on a 1 lb/ft$^3$ foam prepared in accordance with the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DEFINITIONS

The following definitions are provided in order to aid those skilled in the art in understanding the detailed description of the present invention.

The term "invert" or "invert syrup", as used herein, refers to those sucrose-based syrups (e.g., a glucose-fructose concentrated solution) resulting from the hydrolysis of sucrose into glucose, fructose, and residual sucrose, and that has a sugar content within the range of about 50° to about 80° Brix, of which at least 40% to 100% is a mixture of fructose and glucose. These syrups are produced with the glycoside hydrolase enzyme invertase or an equivalent enzyme, or an appropriate acid, which splits each sucrose disaccharide molecule into its component glucose and fructose monomer molecules; one of each. The general reaction which produces "invert syrup" is shown below.

$C_{12}H_{22}O_{11}$ (sucrose)+$H_2O$ (water)=$C_6H_{12}O_6$ (glucose)+ $C_6H_{12}O_6$ (fructose) High Fructose Corn Syrup (HFCS) would be another route to reach these high glucose and fructose containing syrups.

The term "sucrose", or "sugar", as used herein, means that compound having the general structure shown below, having the name α-D-glucopyranosyl-(1→2)-β-D-fructofuranose (a disaccharide composed of D-glucosyl and D-fructosyl monosaccharide moieties, and sometimes referred to as saccharose), and the molecular formula $C_{12}H_{22}O_{11}$, as well as salts, hydrates, and stereoisomers (e.g., D, L or L, D) thereof.

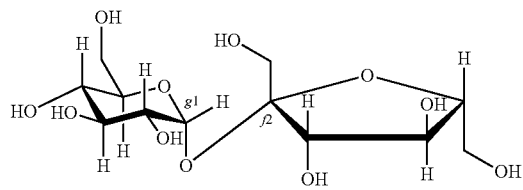

The term "carbohydrate", as used herein, refers to monosaccharides, disaccharides, oligosaccharides, or mixtures of two or more thereof. Examples of suitable carbohydrates include cornstarch, cellulose, corn syrup, dextrose, fructose, molasses, or the like, as well as mixtures thereof. The preferred carbohydrates are at least partially water-soluble. The preferred carbohydrate is also preferably a naturally-occurring carbonydrate, which may or may not have a reducing end group. The carbohydrate may be obtained or derived from any suitable natural source, including but not limited to grain-based sources such as corn, wheat, or switch grass, as well as from milo, barley, millet, sorghum, sugar cane, sugar beets, molasses, whey, potatoes, algae, seaweed, and other biological sources. Processes are known to those of skill in the art how to convert the plant sources to a ususable form (solid or liquid) of the carbohydrate.

The term "brix," or "degrees Brix," as used herein, (and as represented by the symbol ° Bx), is meant to refer to a unit of measurement used in the food industry for measuring the approximate amount of the dissolved solids (sugar) as a sugar-to-water mass ratio of a liquid, typically expressed as a percent dissolved solids. It is typically measured with a saccharimeter that measures specific gravity of a liquid, or with a refractometer, such as the type having a crosshair reticule. For point of example, a 25° Bx solution is 25% (w/w), with 25 grams of sugar per 100 grams of solution. Or, to put it another way, there are 25 grams of sucrose sugar and 75 grams of water in the 100 grams of solution.

The term "compressive strength", as used herein, means the property of foam articles as determined by the test procedure described in ASTM D-3575-77 or ASTM D-1621, expressed in pounds per square inch (psi), or in accordance with DIN 53,577. The term "low compressive strength" as used herein refers to polyurethane foams having a compressive strength of less than about 20 lb/in² at 10% compression when measured in accordance with ASTM D-3575-77 or ASTM D-1621.

The phrases "flame resistant," "fire resistant," "flame retardant" and "fire retardant" as used herein mean: (a) having an ability to not support a flame, fire and/or combustion, either while a flame or fire is present, or once a source of heat or ignition is removed; and/or (b) being retardant to, or incapable of, burning (being fireproof—undergoing virtually no change when exposed to flame, fire and/or combustion process). A flame resistant substrate or other material may char and/or melt.

The phrase "flame retardant chemical", and "flame resistant substance" as used herein means an element, chemical compound, agent or substance that has the ability to reduce or eliminate the tendency of a substrate to burn when the substrate is exposed to a flame or fire, and that is suitable for use with one or more substrates, which may be determined by those of skill in the art.

The phrase "flame spread" as used herein means the propagation of a flame front, as determined by ASTM E-84 or an analogous test method.

The phrase "flame spread rate" as used herein means the distance traveled by a flame front during its propagation per unit of time under specified test or other conditions.

The term "flammability" as used herein means a measure of the extent to which a substrate or material will support combustion under specified test or other conditions.

As used herein, the term "hydroxyl number" is defined as the number of milligrams of potassium hydroxide required for the complete hydrolysis of the fully phthalylated derivative prepared from one gram of polyol, such as determined using ASTM E-222-67 (Method B) or the equivalent. The hydroxyl number can also be defined by the equation:

$$OH=(56.1 \times 1000 \times f)/\text{mol. wt.},$$

wherein:
OH: represents the hydroxyl number of the polyol,
f: represents the functionality of the polyol, i.e., the average number of hydroxyl groups per molecule of the polyol, and
mol. wt.: represents the molecular weight of the polyol.

The expression "polyurethane foam", as used herein, generally refers to cellular products as obtained by reacting polyisocyanates with isocyanate-reactive hydrogen containing compounds, using foaming agents, and in particular includes cellular products obtained with water as a reactive foaming agent (involving a reaction of water with isocyanate groups yielding urea linkages and carbon dioxide and producing polyuria-urethane foams).

As used herein, all numerical ranges provided are intended to expressly include at least all of the numbers that fall within the endpoints of ranges.

Often, ranges are expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The term "optional" or "optionally" means that the subsequently described event or circumstance may or may not occur, and that the description includes instances where said event or circumstance occurs and instances where it does not. For example, the phrase "optionally substituted" means that the compound referenced may or may not be substituted and that the description includes both unsubstituted compounds and compounds where there is substitution.

The term "open cell" or "open cell foam", as used herein, refers to a foam having at least 20 percent open cells as measured in accordance with ASTM D 6226-10, or the equivalent.

As used herein, "MDI" refers to methylene diphenyl diisocyanate, also called diphenylmethane diisocyanate, and the isomers thereof. MDI exists as one of three isomers (4,4' MDI, 2,4' MDI, and 2,2' MDI), or as a mixture of two or more of these isomers. As used herein, unless specifically stated otherwise, "MDI" may also refer to, and encompass, polymeric MDI (sometimes called PMDI). Polymeric MDI is a compound that has a chain of three or more benzene rings connected to each other by methylene bridges, with an isocyanate group attached to each benzene ring. MDI as used herein may have an average functionality from about 2.1 to about 3, inclusive, with a typical viscosity of about 200 mPa (cPs) to 1,000 mPa (cPs) at 25° C.

The term "functionality", "MDI functionality", or "isocyanate functionality", as used herein, refers to the number average isocyanate functionality of all isocyanates used in preparing the isocyanate, and is typically referred to as "Fn."

The term "isocyanate index", or "NCO index", refers to the ratio of NCO groups (or equivalents) to isocyanate-reactive hydrogen atoms (or equivalents) present in a formulation, given as a percentage:

$$\frac{[NCO] \times 100\%}{[\text{active hydrogen}]}$$

In other words, the NCO-index expresses the amount of isocyanate actually used in a formulation with respect to the amount of isocyanate theoretically required for reacting with the amount of isocyanate-reactive hydrogens used in a formulation.

As used herein, the phrase "anti-scorching agent" refers to those additive compounds which may be included in a formulation so as to ameliorate or prevent scorching in flame-retarded foam products. In this regard, the term "scorching" relates to the discoloration of a foam product, such as that event that occurs during or after the foaming reaction when flame retardants are used in polyurethane foams. For example, flame retarded foams can scorch during the first few hours of storage after the foaming process, a phenomenon that is especially likely when the new foam buns are stacked and heat transfer from the center of the buns is inhibited. Scorch not only reduces the aesthetic quality of the foam product by discoloring it, but it can also cause degradation of the foam product's physical properties.

Further, unless stated to the contrary, a formula with chemical bonds shown only as solid lines and not as wedges or dashed lines contemplates each possible isomer, e.g., each enantiomer and diastereomer, and a mixture of isomers, such as racemic or scalemic (mixtures of unequal amounts of enantiomers) mixtures.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created a polyurethane foam using natural polyols as the major or sole polyol component, in a variety of foam densities (e.g., from 0.5 lb/ft$^3$ to 5 lb/ft$^3$), wherein the foams exhibit a high green value as determined by bio content determination, and/or a high burn resistance, as determined by a number of standard tests, including flame spread, smoke development, and/or flash over resistance. "Flash over" is the phenomenon wherein the plastic or polymeric material reaches a critical point in the combustion process. It is obvious in observation but is defined specifically in NFPA 286, incorporated herein by reference. The physical phenomenon is when the room is totally consumed in flames. The sugar-based foam compositions described herein have been shown to actively and reproducibly achieve the ICC ES AC 377 Appendix X approval, the relative contents of which are incorporated herein by reference.

The foams are polyurethane (PU) foams which include the following categories: Conventional foam, High Resiliency (HR) foam, Filled Foams including foams filled with reground polyurethane foam as a type of filler, High-Load-Bearing foam, Spray Foams, Insulation Foams, Packaging Foams, and Reticulated foam as described, for example, in U.S. Pat. Nos. 3,475,525, 3,061,885, and 5,312,846, the appropriate sections of the disclosures of which are incorporated herein by reference.

Without being bound by theory, the concept is that the reactive groups of the crosslinker or chain-extender would bond more readily with the scarce isocyanate groups in areas where hydroxyl groups on the natural polyols are not available, thus giving the foam more integrity. The polyurethane foam of the present disclosure is produced by combining a natural polyol, a multifunctional isocyanate, and a non-halogen blowing agent, preferably water, or a combination of water and another non-halogen containing blowing agent, with one or more of a class of plasticizers and one or more of a class of crosslinker/extenders, and, optionally, in the presence of catalysts, stabilizers, emulsifiers, and other auxiliaries and additives, as required depending upon the target closed cell density of the product polyurethane foam product. Each of these ingredients will be discussed below.

Polyols

A basic raw material for the production of polyurethane foams disclosed herein is the natural polyol, which may be an aliphatic or aromatic polyhydroxy compound, that will react with the isocyanate. This polyol may be a polyether polyol, a polyester polyol, or combinations thereof. The term "natural polyol" as used herein refers to the use of naturally-occurring compounds (polyols from natural sources, which are non-synthetic) which are classified as polyols, including but not limited to sucrose, dextrose, xylose, fructose, glucose, sorbitol, maltose, erythritol, hexose, sugar invert, sugar beet polyol extracts, molasses, corn syrup, and combinations thereof, as well as sugar-based polyols, including mannitol, glycerol, monosaccharides, disaccharides (e.g., lactose), trisaccharides (e.g., maltotriose), poly(n-alkylglucosides), and other carbohydrate oligomers. The natural polyols used in the compositions of the present disclosure are typically used in an amount ranging from about 20 pphp (parts per hundred parts polyol used, or wt. %, equivalently) to about 70 pphp, and more preferably from about 25 pphp to about 55 pphp, inclusive, as well as in amounts within this range, such as about 49 pphp.

Any natural material having active hydrogens, as determined by the Zerewitinoff method [as described by Kohlerin, *Journal of American Chemical Society*, Vol. 49, pp 31-81 (1927)], may be utilized to some extent and therefore is included within the broad definition of the natural polyols. For the preparation of foams of the present disclosure, the useful natural polyol(s), in general, have a weight average molecular weight of from about 50 to about 4000, a functionality of from about 2 to about 14, and a hydroxyl number in a range from about 14 to about 1800, preferably from about 50 to about 500, and more preferably from about 100 to about 200.

The polyols of the present polyurethane compositions may also be a mixture of natural polyols and other polyol materials which are non-natural. Examples of such non-natural polyol materials include, but are not limited to, graft co-polymer polyols such as styrene acrylonitrile (SAN) polyols, urea polyols, step-growth copolymer polyols such as polyisocyanate polyaddition polyols (PIPA polyols), i.e., polyols made from reacting hydrazine and toluene diisocyanate, polyharnsoff dispersion polyols (PHD polyols), and epoxy dispersion polyols.

The polyols which can be utilized in the present invention when in combination with one or more natural polyols include, but are not limited to, the following polyether polyols: alkylene oxide adducts of polyhydroxyalkanes; alkylene oxide adducts of non-reducing sugars and sugar derivatives; alkylene oxide adducts of polyphenols; and alkylene oxide adducts of polyamines and polyhydroxyamines. Alkylene oxides having two to four carbon atoms generally are employed, with propylene oxide, ethylene oxide and mixtures thereof being preferred.

The polyether polyol usually has a hydroxyl functionality between 2 and 3 and a molecular weight between 1000 and 6000. The polyol or polyol blend should have an average hydroxy functionality of at least 2. The equivalent weight is determined from the measured hydroxyl number. The hydroxyl number is defined as the number of milligrams of potassium hydroxide required for the complete hydrolysis of the fully acetylated derivative prepared from one gram of polyol. The relationship between the hydroxyl number and equivalent weight is defined by the equation: OH=56,100/equivalent weight, where OH equals the hydroxyl number of the polyol.

The polyols may include the poly(oxypropylene) and poly(oxyethylene-oxypropylene) triols. Ethylene oxide, when used can be incorporated in any fashion along the polymer chain. Stated another way, the ethylene oxide can be incorporated either in internal blocks, as terminal blocks, or may be randomly distributed along the polyol chain.

A portion or all of the polyol component may be added in the form of a polyol polymer in which reactive monomers have been polymerized within a polyol to form a stable dispersion of the polymer solids within the polyol.

The amount of polyol used is determined by the amount of product to be produced. Such amounts may be readily determined by one skilled in the art.

Polyether polyols are most commonly used in the production of polyurethane foams. Polyether polyols can be made by the addition reaction of alkylene oxides to such initiators as sucrose, glycerin, triethanol amine, and the like. Suitable alkylene oxides include ethylene oxide, propylene oxide, butylene oxide, isobutylene oxide, N-hexyl oxide, styrene oxide, trimethylene oxide, tetrahydrofuran, epichlorohydrin, and the like. Propylene oxide is preferred to ethylene oxide as the former yields polyether polyols with secondary hydroxyl groups. Representative examples of polyether polyols are polyether diols such as polypropylene glycol, polyethylene glycol and polytetramethylene glycol; polyether triols such as glycerol triols; polyether tetrols and pentols such as aliphatic amine tetrols and aromatic amine tetrols; polyether octols such as sucrose octol; and others such as sorbitol, trimethylol propane, and pentaerythritol.

One preferred class of natural polyols used in these formulations are polyether triols based upon glycerine, or trimethylolpropane (TMP).

The polyol can be suitable polyesters containing hydroxyl groups including, for example, the reaction products of polyhydric, preferably dihydric alcohols with the optional addition of trihydric alcohols and polybasic, preferably dibasic carboxylic acids. Examples of such carboxylic acids and their derivatives include dimerized and trimerized unsaturated fatty acids optionally mixed with monomeric unsaturated fatty acids such as oleic acid, dimethyl-terephthalate, terephthalic acid-bis-glycol esters, and poly-alkylene terephthalate. Suitable polyhydric alcohols include glycols, e.g. ethylene glycol, propylene glycol, diethylene glycol, triethylene glycol, tetraethylene glycol, and higher polyethylene glycols and polyalkylene glycols.

Polyurethane foams are one of the largest outlets for polyester polyols. Representative examples of polyester polyols that can be used to make polyurethane foams in accordance with the present disclosure also include ethylene and diethylene glycol, glycol adipates, butanediol adipate, polytetramethylene glycol adipate, hexanediol adipate, and the polyols produced from terephthalate and derivatives thereof, including, for example, dimethyl terephthalate or the digestion product of polyethylene terephthalate, reacted with diols and triols.

Similarly, natural polyol compounds used in the present invention may be any of the conventional ones exemplified by aliphatic polyesterglycols such as polyethylene adipate; polybutylene adipate; polypropylene adipate and the like with extended chain length obtained by the condensation reaction between an aliphatic glycol and a dicarboxylic acid; polyalkyleneether glycols such as polypropyleneether glycol, tetramethyleneether glycol and the like obtained by the ring-opening polymerization of cyclic ethers such as ethylene oxide, propylene oxide, tetrahydrofuran and the like; polyesterglycols obtained by the ring-opening polymerization of ε-caprolactone; diol compounds obtained by converting the terminal groups in polybutadienes into hydroxy groups; copolymers of two or more kinds of alkylene oxides; copolymers of two or more kinds of glycols and a dicarboxylic acid; polyester polyols obtained by the co-condensation of a dicarboxylic acid and a polyol such as aromatic glycols, long-chain diols, glycerin, trimethylolpropane and the like; and polyether polyols obtained by the ring-opening polymerization of a cyclic ether such as ethylene oxide, propylene oxide and tetrahydrofuran with a polyol such as glycerin or trimethylolpropane as the initiator.

These compounds are merely illustrative examples of polyol sources that may be used in connection with this invention, and it is to be understood that any known polyol source that is acceptable in the making of polyurethane may be used.

Isocyanates

Another required ingredient for the production of the polyurethane foam compositions disclosed herein is one or more isocyanates, such as monomeric and/or multifunctional isocyanates, which may be aromatic or aliphatic isocyanates or diisocyanates. Diphenylmethane diisocyanate (MDI) and toluene diisocyanate (TDI) are basic raw material in the production of polyurethane foams, both of which are monomeric and may be used in accordance with the compositions and methods of the present disclosure. Polyurethane foams in accordance with the present disclosure may also be produced from the reaction of polyols and polymeric diphenylmethane diisocyanate, a multifunctional isocyanate.

An organic compound, which has exclusively aromatic isocyanate groups, is referred to as an "aromatic isocyanate." An isocyanate group that is bonded to an aromatic or heteroaromatic radical is referred to as "aromatic." An organic compound that contains aliphatic isocyanate groups is referred to as an "aliphatic isocyanate." An isocyanate group that is bonded to an aliphatic, cycloaliphatic or arylaliphatic radical is referred as "aliphatic."

As aromatic polyisocyanates, for example, the following can be used: monomeric di- or triisocyanates, such as 2,4- and 2,6-toluoylene diisocyanate and any mixtures of these isomers (TDI), 4,4'-, 2,4'- and 2,2'-diphenylmethane diisocyanate and any mixtures of these isomers (MDI), mixtures that include MDI and MDI homologs (polymeric MDI or PMDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), dianisidine diisocyanate (DADI), 1,3,5-tris-(isocyanatomethyl)-benzene, tris-(4-isocyanatophenyl)-methane, tris-(4-isocyanatophenyl)-thiophosphate, oligomers and polymers of the above-mentioned isocyanates, as well as any mixtures of the above-mentioned isocyanates. MDI and TDI are preferred.

As aliphatic polyisocyanates, for example, the following can be used: monomeric di- or triisocyanates such as 1,4-tetramethylene diisocyanate, 2-methylpentamethylene-1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and -1,4-diisocyanate, 1-methyl-2,4- and -2,6-diisocyanato-cyclohexane, and any mixtures of these isomers (HTDI or $H_6$TDI), 1-isocyanato-3,3,5-trimethyl-5-isocyanatomethyl-cyclohexane (=isophorone diisocyanate or IPDI), perhydro-2,4'- and -4,4'-diphenylmethane diisocyanate (HMDI or $H_{12}$MDI), 1,4-diisocyanato-2,2,6-trimethylcyclohexane (TMCDI), 1,3- and 1,4-bis-(isocyanatomethyl)-cyclohexane, m- and p-xylylene diisocyanate (m- and p-XDI), m- and p-tetramethyl-1,3- and -1,4-xylylene diisocyanate (m- and p-TMXDI), bis-(1-isocyanato-1-methylethyl)-naphthalene, dimeric and trimeric fatty acid isocyanates, such as 3,6-bis-(9-isocyanatononyl)-4,5-di-(1-heptenyl)-cyclohexene (dimeryl diisocyanate), α, α, α', α', α'', α''-hexamethyl-1,3,5-mesitylene triisocyanate, oligomers and polymers of the above-mentioned isocyanates, as well as any mixtures of the above-mentioned isocyanates. HDI and IPDI can be used, as appropriate.

Preferably, the compositions described herein comprise a monomeric MDI component comprising 2,4'-MDI. As set forth previously herein, the terminology monomeric MDI denotes a component comprising the MDI isomers, such as 2,4'-MDI, 4,4'-MDI, or 2,2'-MDI. As compared to 4,4'-MDI and 2,2'-MDI, 2,4'-MDI is an asymmetrical molecule and provides two NCO groups of differing reactivities. Therefore, without intending to be limited by theory, the 2,4'-MDI is typically present in the polyisocyanate composition to optimize flexible polyurethane foaming reaction parameters such as stability and curing time of the flexible polyurethane foam. The 2,4'-MDI is present in the monomeric MDI component in an amount greater than 10 parts by weight of the 2,4'-MDI based on 100 parts by weight of the monomeric MDI component. The 2,4'-MDI is more typically present in the monomeric MDI component in an amount of greater than 35, most typically greater than 65 parts by weight based on 100 parts by weight of the monomeric MDI component.

The monomeric MDI component may further include 2,2'-MDI and 4,4'-MDI. It is preferred that 2,2'-MDI is either not present at all in the monomeric MDI component or is present in small amounts, i.e., typically from 0 to 2, more typically 0.1 to 1.5 parts by weight based on 100 parts by weight of the monomeric MDI component. The 4,4'-MDI is typically present in the monomeric MDI component in an amount of from 0 to 65, more typically 20 to 55, and most typically 30 to 35 parts by weight based on 100 parts by weight of the monomeric MDI component.

The monomeric MDI component is typically present in the polyisocyanate composition in an amount of from 80 to 100, more typically 90 to 98 parts by weight based on 100 parts by weight of the polyisocyanate composition.

As indicated above, the polyisocyanate composition may also, optionally, comprise a polymeric diphenylmethane diisocyanate (MDI) component. The isocyanate, when present as a polymeric MDI component is typically present in the polyisocyanate composition to provide reactive groups, i.e., NCO groups, during a flexible polyurethane foaming reaction, as set forth in more detail below. The polymeric MDI component is typically a mixture of oligomeric diphenylmethane diisocyanates, i.e., a mixture of MDI and its dimer and/or trimer. The polymeric MDI component comprises a crude MDI having three or more benzene rings including NCO groups. The polymeric MDI is typically obtained through the condensation of aniline and formaldehyde in the presence of an acid catalyst, followed by phosgenation and distillation of a resulting polymeric amine mixture. The polymeric MDI component is typically present in the polyisocyanate composition in an amount of from 1 to 20, more typically 2 to 10 parts by weight based on 100 parts by weight of the polyisocyanate composition.

In accordance with the present disclosure, the compositions of the present disclosure are preferably prepared with an isocyanate having a functionality ranging from about 2.0 to about 3.0 (inclusive), and more preferably from about 2.1 to about 2.8, inclusive, including functionalities of 2.2, 2.3, 2.4, 2.5, 2.6, and 2.7, as well as ranges in between (e.g., from about 2.3 to about 2.7); and, an NCO content ranging from about 20.0 to about 40.0 wt. %, preferably from about 28.0 wt. % to about 35.0 wt. %, inclusive. Exemplary suitable isocyanates for use herein include, without limitation, Lupranate® M10 and Lupranate® M20, both polymeric MDI's (polymethylene polyphenylpolyisocyanate) available from BASF Corporation (Wyandotte, Mich.).

Other isocyanates can be utilized in this invention, either in place of or in combination with MDI, TDI, and/or polymeric MDI. Such isocyanate compounds are well known in the art, and are selected from, for instance, aliphatic, cycloaliphatic, and aromatic polyisocyanates, e.g., the alkylene diisocyanates and the aryl diisocyanates, and combinations thereof. Those skilled in the art are aware of properties that various isocyanates can add to a foam.

A wide variety of known isocyanate compounds may be used in accordance with the present invention, including esters of isocyanic acid. Any of the conventional polyisocyanates known in the art may be employed in the present invention. Examples of isocyanate sources suitable for use with the formulations and methods of the present invention include polyvalent isocyanates including diisocyanates, such as m-phenylenediisocyanate; p-phenylenediisocyanate; 2,6-trichloroethylenediisocyanate; naphthalene-1,4-diisocyanate; 2,4-trichloroethylenediisocyanate; diphenylmethane-4,4'-diisocyanate (MDI); 3,3'-dimethoxy-4,4'-biphenyl-diisocyanate; propylene-1,2-diisocyanate; 3,3'-dimethyldiphenylmethane-4,4'-diisocyanate; trimethylhexamethylene diisocyanate; xylenediisocyanate including xylylene-1,4-diisocyanate; hexamethylenediisocyanate; 4,4'-diphenylpropanediisocyanate; trimethylenediisocyanate; butylene-1,2-diisocyanate; cyclohexanediisocyanate; cyclohexylene-1,2-diisocyanate; cyclohexylene-1,4-diisocyanate; isophorone-diisocyanate (IPDI), dicyclohexylmethane-4,4'-diisocyanate, and the like; the aforementioned 2,4-tolylenediisocyanate (2,4-TDI); 2,6-tolylenediisocyanate (2,6-TDI); mixtures of 2,4-TDI and 2,6-TDI; dimer and trimer of 2,4-TDI; metaxylylenediisocyanate; 4,4'-biphenyldiisocyanate; diphenylether-4,4'-diisocyanate; 3,3'-ditoluene-4,4'-diisocyanate; dianisidinediisocyanate; 4,4'-diphenylmethanediisocyanate; 3,3'-diethyl-4,4'-diphenylmethanediisocyanate; 1,5-naphthalene diisocyanate; diisothiocyanates, such as p-phenylenediisothiocyanate; xylene-1,4-diisothiocyanate; ethylidine-diisothiocyanate and the like; triisocyanates, such as triphenylmethanetriisocyanate and the like including 4,4',4"-triphenylmethanetriisocyanate; toluene-2,4,6-triisocyanate and the like; tetraisocyanates, such as 4,4'-dimethyldiphenyl methane-2,2',5,5'-tetraisocyanate and the like; isocyanate prepolymers, such as an adduct of trichloroethylenediisocyanate with hexanetriol; an adduct of hexamethylenediisocyanate with hexane triol; an adduct of trichloroethylenediisocyanate with hexane triol; an adduct of trichloroethylenediisocyanate with trimethylol propane, and the like. The polyisocyanates may also be used in the form of their derivatives, e.g., the reaction products with phenols, alcohols, amines, ammonia, bisulphite, HCl etc., and the polyester based isocyanate terminated prepolymer and IPDI. Individual examples of these are phenol, cresols, xylenol, ethanol, methanol, propanol, isopropanol, ammonia, methylamine, ethanolamine, dimethylamine, aniline and diphenylamine. Relatively high molecular weight addition products, e.g., of polyisocyanates with polyalcohols such as ethylene glycol, propylene glycol, trimethylolakanes or glycerol may also be used.

These compounds are merely illustrative examples of isocyanate sources that may be used in connection with this invention, and it is to be understood that any known isocyanate source that is acceptable in the making of polyurethane may be used.

Organic isocyanates useful in producing polyurethane foam in accordance with this invention are organic compounds that contain, on average, between about one and a half and about six isocyanate groups, and preferably about two isocyanate groups.

The amount of isocyanate to be used is dependent upon the isocyanate index of foam desired and the final properties of the foam to be formed. The isocyanate index is the moles of isocyanate (NCO) present compared to the moles of isocyanate-reactive compounds, expressed as a percent. If the isocyanate index is 100, then there is a stoichiometric equivalent of the amount of isocyanate needed to react with the polyol component and the other active hydrogen containing components, such as water, in the system. If a 3 mole percent excess of isocyanate is incorporated into the foam, then the isocyanate index is 103. Generally speaking, as the isocyanate index increases, the amount of water and free hydroxyl groups available to react decreases.

While the present invention may be practiced in a wide range of indicies, i.e., from about 15 to about 500, the preferred range of indexes is between about 20 and about 60, inclusive, more preferably between about 20 and about 40, inclusive. For example, and without limitation, a 0.5 pcf (lb/ft$^3$) density foam product may be produced in accordance with the present disclosure wherein the index is about 21.

Blowing Agents

In addition to the isocyanate and the natural polyol, the production of polyurethane foam requires the presence of a foaming or blowing agent. Fluorocarbon blowing agents such as trichlorofluoromethane have been used to produce foams in the past; however, the future of the fluorocarbon blowing agents depends upon government regulations, and thus their use in commercial products has been falling out of favor in the industry. The heat of reaction, and sometime externally applied heat, causes expansion of the fluorocarbon compound when it is used as the foaming agent. Methylene chloride has displaced most of the fluorocarbon compounds in the production of flexible foams. However, it is becoming more desirable to remove all halogen-containing compounds from the process to meet health and environmental standards. Therefore, non-halogen containing blowing agents, both in the form of liquids such as pentane and gases such as carbon dioxide may be used in accordance with the present disclosure. Fourth-generation blowing agents, typically referred to as the AFA series—which can be in both liquid and gas formulations, and include AFA molecules such as 245FA (1,1,1,3,3-pentafluoropropane, available as ENOVATE® 3000, from Honeywell International, Inc.), HFC-365mfc (1,1,1,3,3-pentafluorobutane, available as FORANE® 365mfc from Arkema, Inc.) and 134A (1,1,1,2-tetrafluoroethane, available as FORANE® 134a, available from Arkema, Inc.) may also be optionally included in the formulations of the present disclosure, as appropriate. Other blowing agents which are suitable for use herein include the hydrofluoroolefine (HFO) class of blowing agents, including HFO-1234ze (trans-1,3,3,3-tetrafluoropropene, available from Honeywell) and similar blowing agents within this class of compounds.

A common foaming, or blowing, agent, and the preferred blowing agent for the process of the present disclosure, is water. Frequently water and an optional, auxiliary blowing agent can be used together, although this is not necessary for practicing the present invention, as water alone may be used as the blowing agent. While not intending to be limited by a particular theory, it is believed that water added to the reaction of the isocyanate and natural polyol reacts with the isocyanate to form an unstable carbamic acid which decomposes to the corresponding amine and carbon dioxide. The amine then reacts with another isocyanate group to form a symmetrical disubstituted urea. Either hydrogen of the disubstituted urea may react further with another isocyanate to form a biuret which provides additional polymer branching or crosslinking. The reactions of the isocyanate with water and polyol are exothermic.

As set forth above, water is preferably the sole blowing agent used in accordance with the present disclosure, to produce carbon dioxide by reaction with isocyanate. Water should be used in an amount ranging from about 0.1 to about 60 parts per hundred parts (pphp) of natural polyol, by weight (pphp), preferably between about 2 and about 50 pphp, more preferably between about 3 and about 30 pphp, as well as in amounts between these ranges, such as between about 3.5 pphp and about 6 pphp, e.g., about 4.5 pphp. At foam indexes below 100, the stoichiometric excess of water blows via vaporization and cools the foam, and does not take part of the reaction to produce carbon dioxide.

Other blowing agents that are conventionally used in the art may be used herein, in combination with the water blowing agent, but because of the utility of the current formulation, large amounts of such agents are no longer needed and in many cases none are needed at all. Fluorocarbon compounds, such as trichlorofluoromethane, have been used because they expand easily when heated and they do not react with the polyol and isocyanate. Fluorocarbon compounds continue to be used in the production of some rigid foams; however, methylene chloride has displaced most of the fluorocarbon compounds in the production of flexible foams. While a goal of the present invention is to produce soft PU foams using water as the primary blowing agent, inert physical blowing agents such as trichlorofluoromethane, or acetone nevertheless can be included. While the amount of inert blowing material may range from about 0 to about 30 pphp, commercially acceptable foams can generally be made using between about 0 and about 8 pphp, typically between about 0 and about 5 pphp, more typically between about 1 and about 3 pphp.

It is desired to replace as much as possible of the halogen containing foaming agent with a non-halogen foaming agent, e.g. water, carbon dioxide, formic acid, bicarbonates, and the like, and it is preferred in accordance with the present disclosure to only use a non-halogen foaming agent.

When, as preferred in this invention, water is provided as the foaming agent, the water/isocyanate reaction generates carbon dioxide which expands to provide the expansion or foaming of the polyurethane being produced. One of the main problems involved in replacing the ozone-depleting fluorocarbon compound as blowing agent in flexible polyurethane foams with water is the increased firmness of the resulting foams. This is likely due to the bidentate urea groups introduced as a result of the water-isocyanate reaction. With MDI- or TDI-based flexible foams, this problem can be compounded because they are selected for their softness and flexibility and the increased stiffness makes the foams less desirable. One method, as found in this invention, to obtain softer water-blown foams is to use plasticizers, some of which double as flame retardants.

Plasticizers

The use of water as the foaming (or blowing) agent in the flexible polyurethane foams of the present disclosure increases the firmness of the resulting sugar-based foams. A soft, flexible, plasticized water-blown polyurethane foam composition can be produced from the reaction of a natural polyol and MDI or an equivalent isocyanate by adding a plasticizer selected from the group consisting of benzoates, phenols, phthalates, phosphates or phosphorus-containing or classified as flame retardants, as well as mixtures or combinations thereof, to the reaction mixture. Exemplary types of plasticizers used in this invention are described in U.S. Pat. No. 5,624,968, the relevant disclosure of which is incorporated by reference herein.

The polyurethane foam compositions of the present disclosure can include, in accordance with select embodiments, one or more plasticizers, including but not limited to one or more plasticizers selected from the group of phthalate plasticizers, phosphate or phosphorus-containing plasticizers and benzoate plasticizers. These plasticizers may be added to produce a softer, more flexible polyurethane foam which, more importantly, displays good load bearing properties without significant loss of the other required strength properties.

The effective level of plasticizers is very broad. Typically, acceptable polyurethane foams prepared in accordance with the methods of the present disclosure will incorporate plasticizer and/or flame retardant compounds in an amount ranging from about 0.1 to about 40 pphp, inclusive. While this range is preferred, it is recognized that less plasticizer and/or flame retardant may be added and that this reduced amount of plasticizer will provide some softening effect upon the composition, and greater amounts of plasticizer may be desired in some compositions. Typically the amount is between about 0.5 pphp and about 35 pphp, preferably between about 1 pphp and about 30 pphp, more preferably between about 1.5 pphp and about 25 pphp, inclusive, as well as amounts or ranges within these ranges, e.g., about 24 pphp, or from about 6 pphp to about 12 pphp. Such amounts may be as pure solid or liquid compounds, or the plasticizer may be dissolved in an appropriate solution or liquid, in concentrations ranging from about 2 molar to about 40 molar, more preferably from about 5 molar to about 15 molar, inclusive, as well as concentrations within these ranges, such as about 7 molar, or about 12 molar.

Plasticizers useful in this invention include phthalate plasticizers such as, for example, alkyl aryl phthalates, or alkyl benzyl phthalates, including butyl benzyl phthalate, alkyl benzyl phthalate, preferably wherein the alkyl group has a carbon chain of from seven to nine carbon atoms, Texanol™ benzyl phthalate, (which is 2,2,4-trimethyl-1,3-pentanediol-monobutyrate benzyl phthalate), alkyl phenyl phthalate, symmetrical and unsymmetrical dialkyl phthalates including diisononyl phihalate, diisodecyl phthalate, dioctyl phthalate, Di-n-butyl phthalate, Dioctyl phthalate, dihexyl phthalate, diheptyl phthalate, butyloctyl phthalate, linear dialkyl phthalate wherein the alkyl groups are independently carbon chains having from seven to eleven carbon atoms, and butyl cyclohexyl phthalate; phosphate plasticizers such as tris-(2-chloro-1-methylethyl)phosphate, tris-(alpha-chloroethyl)phosphate (TCEP), tris-(2,3-dichloro-1-propyl)phosphate, YOKE-V6 (tetrakis-(2-chloroethyl) dichloroisopentyldiphosphate), and the like; phosphate ester plasticizers such as, for example, 2-ethylhexyl diphenyl phosphate, isodecyl diphenyl phosphate, mixed dodecyl and tetradecyl diphenyl phosphate, trioctyl phosphate, tributyl phosphate, butylphenyl diphenyl phosphate and isopropylated triphenyl phosphate; and benzoate plasticizers such as, for example, Texanol™ benzoate (which is 2,2,4-trimethyl-1,3-pentanediol-monobutyrate benzoate), glycol benzoate, propylene glycol dibenzoate, dipropylene glycol dibenzoate, and tripropylene glycol dibenzoates.

Preferred plasticizers in accordance with selected embodiments are the phthalate and the phosphate or phosphorus-containing plasticizers, such as alkyl, aryl, or alkyl substituted aryl phosphates. More preferably, the plasticizers are phosphorus containing plasticizers, such as TCPP (tris (chloroisopropyl)phosphate, TCPP-LO, TCEP (tris(chloroethyl)phosphate, tris(chloropropyl)phosphate, tri-cresyl phosphate, TDCP and TDCP-LV, with the most preferable plasticizer being TMCP, tris-(2-chloro-1-methylethyl)phosphate, which is also a fire retardant. Other phosphates or phosphonates may also be used as flame retardant additives in accordance with the present disclosure, in an effective amount.

In accordance with select embodiments of this disclosure, non-halogentated fire retardants may be used, as it has advantageously been found that, due to the synergy between the fire/flame retardant and the sucrose, a reduced amount of flame retardant additive is needed in order to obtain the FR rating of standard flexible foam, e.g., about 3 wt. %, versus about 15 wt. % in standard flexible foam products. Suitable non-halogenated fire retardants include phosphorus-containing flame retardant materials, and low melting temperature phosphorus-containing flame retardant materials. Examples of suitable phosphorus-containing flame retardant materials include dimer and oligomeric phosphorus compounds such as piperazine polyphosphate, ammonium polyphosphate, ethylene diamine phosphate, and other phosphorus-nitrogen-based flame retardants such as melamine derivatives.

The low melting temperature phosphorus-containing flame retardant agent can be a liquid or a solid at room temperature, When the low melting temperature phosphorus agent is a solid at room temperature, it has a melting temperature less than about 170 degrees Celsius, A particularly useful example of a low melting temperature phosphorus-containing flame retardant agent is bisphenol A polyphosphate liquid (also known as BAPP or BDP). Other useful low melting temperature phosphorus-containing flame retardant agents include phosphate esters such as resorcinol bis(diphenylphosphate), resorcinol dixylenyl phosphate (both oligomeric and monomeric versions), trixylenyl phosphate, triethyl phosphate, and triphenyl phosphate.

The non-halogenated flame retardant agents may also be metal containing fire retardants, such as inorganic hydrates or inorganic hydroxides, including but not limited to inorganic hydroxides selected from the group consisting of $Ca(OH)_2$, $Mg(OH)_2$ and $Al(OH)_3$, particularly high-purity, finely precipitated inorganic hydroxides, alone or in combination, such as at least two of such inorganic hydroxides. Preferably, the inorganic hydroxide is a hydroxide of a metal of group 2 of the periodic table of elements. Suitable metal hydrates which may be used as non-halogenated flame retardants in accordance with the compositions of the present invention are hydrates of at least one metal selected from the group consisting of Mg, Ca, Al, Fe, Zn, Ba, Cu and Ni. Such metal hydrates are easy to atomize, stable as a hydrate, an exhibit excellent heat absorbing properties and dehydration reactivity upon heating, thus exerting excellent flame retarding effects.

The metal hydrate is not particularly limited as long as it has a flame-retardant component. Specific examples of suitable metal hydrates for use as non-halogenated flame retardants include, but are not limited to, metal hydrates such as aluminum hydroxide ($Al(OH)_3$), magnesium hydroxide ($Mg(OH)_2$), calcium hydroxide ($Ca(OH)_2$), iron hydroxide (Fe $(OH)_2$), zinc hydroxide ($Zn(OH)_2$), copper hydroxide (Ca $(OH)_2$), and nickel hydroxide ($Ni(OH)_2$); hydrates of calcium aluminate, gypsum dihydrate, zinc borate, and barium metaborate; and composite hydrates obtained by combinations of some of the above hydrates.

By an effective amount of the flame retardant additive, it is meant that amount sufficient to meet or exceed the test standards set forth in DIN 4102 B2 flammability test, or the ASTM E-84 flame and smoke tests. Generally, this can be in the range of from about 1 pph (parts per hundred) to about 150 pph of the flame retardant additive, based on the total weight of the flame retarded polyurethane foam or flame retarded polyurethane foam formulation. In some embodiments, an effective amount is to be considered in the range of from about 2 pph to about 100 pph more preferably in the range of from about 3 pph to about 60 pph, both on the same basis.

The flame retardant additive of the present invention also provides for polyurethane or polyisocyanurate foams having low smoke emissions and/or low surface flame spread. By low smoke emissions, it is meant that the polyurethane foam containing an effective amount of a flame retardant additive as described herein has a corrected smoke density, as determined by ASTM E-84 in non-flaming mode, in an amount less than about 450. By low surface flame spread, it is meant that the polyurethane foam product has a corrected flame spread, as determined by ASTM E-84, of about 75 or less, especially for foams with a density from about 0.3 $lb/ft^3$ to about 5 $lb/ft^3$.

Other plasiticizers that may be used in accordance with the present disclosure include ethoxylated aliphatic monohydric or polyhydric alcohols, alkyl or alkylphenol oxylalkylates, and alkyl phenols. The water-soluble esters of the ethoxylated $C_8$-$C_{36}$ aliphatic monohydric or polyhydric alcohols with aliphatic acids, and aliphatic dimer acids may be utilized in accordance with this invention. Such ethoxylated esters have a hydrophilic-lipophilic balance (HLB) in the range of 10 to 20.

Useful ethoxylated aliphatic acids have about 5 to about 40 moles of ethylene oxide and/or propylene oxide added per mole of acid. Non-limiting examples include alkoxylated oleic acids, alkoxylated stearic acid and alkoxylated palmitic acid. Useful alkoxylated dimer acids are oleic dimer acid and stearic dimer acid. Aliphatic acids can be either branched or straight-chain and can contain from about 8 to about 36 carbon atoms. Useful aliphatic acids include azelaic acid, sebacic acid, dodecanedioic acid, caprylic acid, capric acid, lauric acid, oleic acid, stearic acid, palmitic acid and the like. Especially useful for the purpose of obtaining the water-soluble esters of this invention are aliphatic, preferably the saturated and straight-chain mono- and dicarboxylic acids containing from about 8 to 18 carbon atoms.

In accordance with other aspects of the present disclosure, the plasticizer can be an alkyl or alkyl phenol oxylalkylate, or similar compound which may also be classified as a nonionic surfactant. Such preferred plasticizers include, but are not limited to, alcohol oxylalkylates, alkyl phenol oxylalkylates, nonionic esters such as sorbitan esters and alkoxylates of sorbitan esters. Examples of suitable compounds include but are not limited to, castor oil alkoxylates, fatty acid alkoxylates, lauryl alcohol alkoxylates, nonylphenol alkoxylates, octylphenol alkoxylates, tridecyl alcohol alkoxylates, such as POE-10 nonylphenol ethoxylate, POE-100 nonylphenol ethoxylate, POE-12 nonylphenol ethoxylate, POE-12 octylphenol ethoxylate, POE-12 tridecyl alcohol ethoxylate, POE-14 nonylphenol ethoxylate, POE-15 nonylphenol ethoxylate, POE-18 tridecyl alcohol ethoxylate, POE-20 nonylphenol ethoxylate, POE-20 oleyl alcohol ethoxylate, POE-20 stearic acid ethoxylate, POE-3 tridecyl alcohol ethoxylate, POE-30 nonylphenol ethoxylate, POE-30 octylphenol ethoxylate, POE-34 nonylphenol ethoxylate, POE-4 nonylphenol ethoxylate, POE-40 castor oil ethoxylate, POE-40 nonylphenol ethoxylate, POE-40 octylphenol ethoxylate, POE-50 nonylphenol ethoxylate, POE-50 tridecyl alcohol ethoxylate, POE-6 nonylphenol ethoxylate, POE-6 tridecyl alcohol ethoxylate, POE-8 nonylphenol ethoxylate, POE-9 octylphenol ethoxylate, mannide monooleate, sorbitan isostearate, sorbitan laurate, sorbitan monoisostearate, sorbitan monolaurate, sorbitan monooleate, sorbitan monopalmitate, sorbitan monostearate, sorbitan oleate, sorbitan palmitate, sorbitan sesquioleate, sorbitan stearate, sorbitan trioleate, sorbitan tristearate, POE-20 sorbitan monoisostearate ethoxylate, POE-20 sorbitan monolaurate ethoxylate, POE-20 sorbitan monooleate ethoxylate, POE-20 sorbitan monopalmitate ethoxylate, POE-20 sorbitan monostearate ethoxylate, POE-20 sorbitan trioleate ethoxylate, POE-20 sorbitan tristearate ethoxylate, POE-30 sorbitan tetraoleate ethoxylate, POE-40 sorbitan tetraoleate ethoxylate, POE-6 sorbitan hexastearate ethoxylate, POE-6 sorbitan monstearate ethoxylate, POE-6 sorbitan tetraoleate ethoxylate, and/or POE-60 sorbitan tetrastearate ethoxylate. Preferred plasticizers of this class include alcohol oxyalkyalates such as POE-23 lauryl alcohol and alkyl phenol ethoxylates such as POE (20) nonyl phenyl ether. Other applicable plasticizers are esters such as sorbitan monooleate.

A further type of plasticizer which may be used in the formulations of the present disclosure include alkyl phenols, preferably non-toxic alkyl phenols, including but not limited to nonyl phenol, dodecyl phenol, di-sec amyl phenol, and the like, as well as combinations thereof.

Crosslinker/Extender

Applicants have found that, depending upon the formulation of the natural polyol-based foam prepared in accordance with the present disclosure, it was possible to overcome physical property deficiencies of water-blown PU foams that contain plasticizers such as phthalates, benzoates and phosphate esters by incorporating an optional chain extender/crosslinker into the foam formulation at low indices.

Sorbitan Monostereate.

This invention incorporates one or more specific crosslinker/chain extenders into the foam formulation. As used herein, the term "crosslinker" is meant to include both compounds generally known as crosslinkers and compounds generally known as chain extenders or simply extenders. Crosslinkers are compounds that contain two or more isocyanate-reactive groups, such as hydroxyl groups, primary amines, and secondary amines.

When crosslinkers are used in formulations in accordance with the present disclosure, the PU foams generated may exhibit improved foam stabilization and/or tear strength, often without discoloring the foam. Exemplary crosslinkers/chain extenders suitable for use within the compositions and processes of the present disclosure include, but are not limited to, amines, including polyamines; polyhydric alcohols; polyoxyalkylene polyols; and polyhydric aromatic compounds, alone or in combination.

The polyamines, 4,4'-methylene-bis-(3-chloro-2,6-diethylaniline) (MCDEA) at 0.5 pphp, and amine terminated polyalkylene oxide such as JEFFAMINE™ T-403 (Huntsman Co.) can be used as optionally-included crosslinkers/chain extenders in accordance with the present disclosure, as well as alkanolamines such as diethanolamine (DEOA) and triethanolamine (TEOA). Other suitable amines include but are not limited to, triisopropanolanune, diisopropanolamine, t-butyltolylenediamine, triaminonane, diethyltolylenediamine, and chlorodiaminobenzene.

Polyhydric alcohols may also be used, including but not limited to 1,3 butanediol, 1,4 butanediol, mono-, di-, and tri-ethylene glycols, 1,2,4-butanetriol, di-propylene glycol, glycerin, trimethylolpropane, pentaerythritol, 2,5-dimethyl-1,2,6-hexanetriol, and glycerol.

Polyoxyalkylene polyols may also be used, suitable examples including but not limited to VORANOL™ 800 (Dow), QUADROL™ (BASF) tetrahydroxypropyl ethylenediamine, HUNTSMAN WL-440™, an ethoxylated trimethylolpropane PEL-RIG™ 9145 and a propoxylated methyl-glucoside, PEL-RIG™ 9350ML. Others suitable compounds include VORANOL™ 370, VORANOL™ 230-660, VORANOL™ 220-530, VORANOL™ 230-238, VORANOL™ 520, VORANOL™ 391 (Dow), ARCOL™ E-746, ARCOL™ LG-650, ARCOL™ LHT-240 (Arco), PEG™ 200, PEG™ 400, PEG™ 1000, PLURACOL™ POLYOL 735, and PLURACOL™ PEP450 (BASF), a POP derivative of pentaerythritol, may also be used herein. The preferred polyoxyalkylene polyols are in a group where the hydroxyl number is less than about 200 and the average number of hydroxyl groups range from 3 to 8.

Several polyhydric aromatic compounds, including resorcinol (1,3-dihydroxybenzene), catechol, hydroquinone, phloroglucinol, and pyrogallol, may also be used, as appropriate.

The crosslinking/extending agent should be present between about 0.1 and about 10 pphp and preferably, between about 0.2 and about 5 php. It is recognized that smaller quantities of crosslinker/extender compounds will provide some benefit, and that larger quantities are also generally effective. The specified ranges are preferred for economic as well as foam property concerns.

The efficacy of a particular crosslinker/extender and plasticizer combination will depend on many factors, including the isocyanate index, the quantity of water, and the other ingredients.

Additives

As indicated above, in addition to the polyol, water, isocyanate, plasticizer, and crosslinker, a variety of additional additives may be included in the A-side or B-side, preferably the B-side, of the composition. These additives include catalysts, cell openers, chain extenders, fillers, and the like.

Other materials can optionally be added to the polyurethane during production to reduce problems during production or to provide desired properties in the polyurethane product. Among the additives are catalysts such as amines and metal salts; cell regulators or surfactants such as silicones (e.g., SILSTAB 2760 or Dabco® DC5604 (a silicone glycol copolymer available from Air Products and Chemicals, Inc., Allentown, Pa.)) to aid thorough mixing of the ingredients and to regulate cell growth and cell formation in the foam, including silicon dioxide, particularly in amounts ranging from about 1 part per 100 parts to about 10 parts per 100 parts, particularly from about 1.5 parts per 100 parts to about 5 parts per 100 parts, inclusive; fillers including reground PU, calcium carbonate, barium sulfate, and the like; colorants; UV stabilizers; fire retardants; bacteriostats; cell openers; and antistatic agents. It is also desirable to include stabilizers and antioxidants such as hindered amine light stabilizers and benzotriazoles.

Surfactant/Cell Openers

A surfactant, usually a polyether-polysiloxane copolymer, can optionally be included and functions as an emulsifier, nucleating agent, and foam stabilizer.

Suitable surface active agents (also known as surfactants) for slabstock applications include "hydrolysable" polysiloxane-polyoxyalkylene block copolymers. Another useful class of foam surface active agents are the "non-hydrolyzable" polysiloxane-polyoxyalkylene block copolymers.

A cell opening agent, such as a polyethylene oxide monol or polyol of an equivalent weight greater than about 200 with a hydroxyl functionality of two or greater, may be included. For example, one cell opening agent is a polyethylene oxide adduct of glycerol of a molecular weight of about 990 gms/mole, with an equivalent weight of about 330. The cell opening agent should be present at about 0.001 to about 20 pphp.

Catalysts

The catalysts which may be used in the preparation of the natural polyol-based polyurethane foams of the present disclosure can be any suitable catalyst known to the art and suitable for use in the manufacture of polyurethane foams, for example organometallic polyurethane catalysts, used to promote the reaction of the isocyanate source with the polyol. The catalyst can be an amine, organometallic compound, an organic acid salt of a metal, a tertiary phosphine, an alkali metal compound, radical forming agents, and like catalyst used in forming polyurethanes.

Amines which may be used as the catalyst in the present invention include, for example, and without limitation, trialkylamines, such as triethylene amine; N,N,N',N'-tetramethyl-1,3-butanediamine; amino alcohols such as dimethyl ethanolamine; ester amines such as ethoxylamine, ethoxyldiamine, bis-(diethylethanolamine)adipate, 1,3,5-tris-(3-dimethylaminopropyl)-1,3,5-triazine, bis-(3-dimethylaminopropyl)methyl-amine, and bis(2-dimethylamino ethyl)ether; triethylenediamine; cyclohexylamine derivatives such as N,N-dimethylcyclohexylamine; morpholine derivative such as N-methylmorpholine; piparazine derivatives such as N,N'-diethyl-2-methylpiparazine, N,N'-bis-(2-hydroxypropyl)-2-methyl piparazine, bis(2,2'-dimethylaminoethyl) ether; amidines such as 1,8-diazabicycloundec-7-ene (DBU), and combinations thereof.

The catalysts suitable for use in accordance with the processes and compositions of the present disclosure can also be alkali metal and alkali metal salt compounds, including potassium acetate, potassium octoate, and similar alkali metal or alkali metal salt compounds. Similarly, alkali metal salts of organic carboxylic acids (alkali metal carboxylates), metal alcoholoates, metal phenolates, metal hydroxides, and or quaternary ammonium salts may be used in accordance with the present disclosure.

Metals of organometallic compounds include, for example, tin, lead, bismuth, cadmium, cobalt, aluminum, potassium, chromium and zinc, may also be used as catalysts in some aspects of the disclosure. Among them, typical embodiments of organotin compounds are dibutyltin dilaurate and dibutyltin bis(2-ethylhexanoate) and the like. As for the various organic acid salts of metals, there are, for example, organic acid salts of oleic acid, naphthoic acid, caproic acid, caprylic acid, and most other organic acids with tin, lead, bismuth, cadmium, cobalt, aluminum, potassium, chromium and zinc.

Examples of organic acid salts of tin suitable for use herein are stannous oleate, tin 2-ethylcaproate, tin naphthoate, tin octylate and the like. Examples of tertiary phosphines suitable for use as catalysts in accordance with the present disclosure include trialkyl phosphine, dialkylbenzyl phosphine and the like, without limitation. Examples of alkali metal compounds include alkali metal hydroxides or fatty acid salts.

As an exemplary radical-forming agent, there are, for example, benzoyl peroxide, lauroyl peroxide, azobisisobutyronitrile and the like which are suitable for use herein.

These catalysts may be used singly or in combination with each other, as appropriate. For example, in accordance with select aspects of the present disclosure, it may be more effective to use an amine together with an organometallic compound or an organic acid salt of a metal.

Suitable catalysts include, but are not limited to, dialkyltin salts of carboxylic acid, tin salts of organic acids, triethylene diamine, bis(2,2'-dimethylaminoethyl)ether, bis(2-dimethylaminoethyl)ether, and similar compounds that are well known to the art. An exemplary suitable blowing agent catalyst suitable for use herein is Dabco® BL-19 catalyst (bis(2-dimethylaminoethyl)ether, or Polycat® 31, a non-emissive amine catalyst, both available from Air Products and Chemicals, Inc., Allentown, Pa.).

Catalysts should be present in an amount ranging from about 0.0001 to about 12 weight percent (wt. %), inclusive, of the reaction mixture, total, as appropriate, and depending upon the final density of the foam product produced from the reaction process. Exemplary amounts of blowing catalyst for use in the instant compositions include from about 1 wt. % to about 4.5 wt. %, and from about 2 wt. % to about 4 wt. %, inclusive.

Anti-Scorch Additives

It is known that the use of some flame retardants (FR) in the manufacture of polyurethane (PU) foams, with only a select few exceptions, can exacerbate the "scorch" problems that arise during the processing of the PU foam products. Scorching is the undesirable discoloration phenomenon which occurs within polyurethane foam blocks or sheets, causing them to assume a yellow or brown color. This discoloration is most typically apparent in the center of the blocks, where the internal temperatures remain high for a relatively long period of time, leading in turn to an increased smoldering tendency. These problems can result in the degradation of the physical properties of the foam product, or in extreme cases, the spontaneous combustion of the foam products.

In accordance with embodiments of the present disclosure, the polyurethane foam compositions may optionally comprise an effective amount of one or more anti-scorch additives, or agents. As used herein with relation to anti-scorch additives, an "effective amount" is an amount sufficient to provide a polyurethane foam product having a diminished scorch discoloration compared to the same or a similar product prepared without the use of the anti-scorch additive. Suitable anti-scorch additives that may be used in the present formulations include, but are not limited to, phenolic anti-oxidants, particularly hindered phenolic anti-oxidants, alone or in combination with other agents such as amine anti-oxidants; benzofuranones; carbodiimides; benzohydroquinones; organophosphorus compounds, particularly aromatic phosphates having the general formula Ar—O—P(O)—OR$_1$, such as described in U.S. Patent publication no. 2005/0014856 A1, as well as combinations of such compounds.

The scorch of products described herein may be evaluated in several manners, including a digital scorch evaluation method or a spectrophotometric method. For the first method, the foam product is photographed using a digital camera, to allow for a visual comparison between the scorch of a reference formulation and the scorch of the formulation under investigation. In a typical method, digital photographs are taken under fully controlled parameters (illumination, filming angles) and then processed by graphic software that scans the photographs having the same resolution and sums up the number of pixels having different colors over a selected slice area. The resulting value, termed Unique Colors (UC), can then be correlated with the visual comparative inspection of the scorch intensity.

For the second method, the foam color can be analyzed using a spectrophotometer. The results can then be expressed in the usual color space relationship: L*a*b and performed in accordance with ASTM D-2244.

Emulsifiers

Emulsifiers may be importantly added to the natural polyol containing polyurethanes in accordance with the present disclosure, such as TERGITOL™ NP-9 and BM-400 emulsifier (BASF, Wyandotte, Mich.), and the like, as well as emulsifiers such as lecithin, including soy lecithin, in a variety of concentrations ranging from about 0.5% (v/v) to about 10% (v/v), for the purpose of preventing any of the natural polyol from coming out of solution prematurely. Other compositions which may be included so as to prevent natural polyols, such as sucrose, from crystallizing out of solution prematurely include invert (e.g., a 6-10% invert solution), water-soluble proteins, such as albumin; and natural sugar esters, such as sorbitan monooleate, and sorbitan monolaurate.

Fillers/Modifiers

Solid stabilizing polymers and other additives, including flame retardants, colorants, dyes and anti-static agents, which are conventionally known in the art may be used with the sugar-based polyurethane foam formulations of the present invention. Exemplary additives listed in U.S. Pat. No. 4,950,694 are exemplary and are incorporated herein by reference.

Other fillers and additives such as esters of aliphatic polyhydroxy compounds and unsaturated carboxylic acids may also be used, as appropriate or desired. Non-limiting examples include acrylates, such as ethylene glycol diacrylate; triethylene glycol diacrylate; tetramethylene glycol diacrylate; trimethylolpropane triacrylate; trimethylolethane triacrylate; pentaerythritol diacrylate; pentaerythritol triacrylate; pentaerythritol tetraacrylate; dipentaerythritol tetraacrylate; dipentaerythritol pentaacrylate; dipentaerythritol hexaacrylate; tri pentaerythritol octaacrylate; glycerol diacrylate; methacrylates, such as triethylene glycol dimethacrylate; tetramethylene glycol dimethacrylate; trimethylolpropane trimethacrylate; trimethylolethane trimethacrylate; pentaerythritol dimethacrylate; pentaerythritol trimethacrylate; pentaerythritol tetramethacrylate; dipentaerythritol dimethacrylate; dipentaerythritol trimethacrylate; dipentaerythritol tetramethacrylate; tri pentaerythritol octamethacrylate; ethylene glycol dimethacrylate; 1,4-butanediol dimethacrylate; sorbitol tetramethacrylate and the like; itaconates, such as ethylene glycol diitaconate; propylene glycol diitaconate; 1,2-butanediol diitaconate; tetramethylene glycol diitaconate; pentaerythritol triitaconate and the like; crotonates such as ethylene glycol dicrotonate; diethylene glycol dicrotonate; pentaerythritol tetracrotonate and the like; and maleates, such as ethylene glycol dimaleate; triethylene glycol dimaleate; pentaerythritol dimaleate and the like.

In accordance with selected embodiments of the present disclosure, it may be particularly advantageous to add an optional anti-oxidant, such as a hindered phenolic, i.e., IRGANOX™ 1010 (Ciba-Geigy), an organic phosphite, or both, to the polyurethane foam composition. Such antioxidants can act to retard any discoloration associated with high temperatures in the manufacture of the foam products. Stabilizers, such as tetrabutylhexamethylenediamine, may also be optionally and beneficially added.

Additional additives that may be optionally included in the formulations of the present invention, particularly as a B-side component, include glycerine, or glycerine-derivatives and analogs, and glycine or glycine derivatives such as ethoxylated and propoxylated glycine, alone or in combination with one or more high (greater than 1000) molecular weight polyols, such as Pluracol® 593 (BASF, Wyandotte, Mich.). Initial results have shown that the use of glycerine or similar compounds provide increased stability in the foam products. When included in the formulation, the amount of glycerine or glycerine-derivatives ranges from about 1 parts per 100 parts to about 20 parts per 100 parts, or alternatively from about 2 parts per 100 parts to about 10 parts per 100 parts, inclusive.

Foam Properties

The polyurethane foam products contemplated herein are comprised of one or more natural polyols, such as sucrose, sugar invert solutions, or other natural polyols as described above; one or more organic isocyanates; blowing agents, especially water; one or more plasticizers or flame retardants; one or more surfactants, and optionally catalysts and/or emulsifiers, as well as other standard ingredients known to those skilled in the art, included as appropriate depending upon the end use of the polyurethane foam product.

The polyurethane foam compositions of the present disclosure may be prepared to have a closed cell apparent, core density ranging from about 0.3 lb/ft$^3$ to about 5.0 lb/ft$^3$, inclusive, including about 0.5 lb/ft$^3$ (pounds per cubic foot, pcf), about 1 lb/ft$^3$, about 2 lb/ft$^3$, about 3 lb/ft$^3$, and about 4 lb/ft$^3$. Typically, a low density insulation is characterized as that foam insulation exhibiting a range per AC377 from about 0.5 lb/ft$^3$ to about 1.4 lb/ft$^3$ (pcf), as determined by ASTM standard D-1622.

The polyurethane foams of the present disclosure exhibit a number of other desired attributes, including 'green' value as determined by a mean biobase value, compliant surface burning characteristics, and compliant foam industry characteristics, as well as desirable core density, tensile strength, dimensional stability, and closed cell content values. Testing of foam products prepared in accordance with the present disclosure were done in accordance with ICC-ES AC377, Appendix X ("Appendix X"), flame spread was determined by ASTM standard E-84, smoke development was determined by ASTM Standard E-84, flame spread in a room was determined by Appendix X, and the biobase value determination was obtained in accordance with ASTM Standard D6866-11. By the use of the term "green", it is meant that the final polyurethane foam composition as prepared in accordance with the present disclosure has a bio-based content, or rapidly-renewable natural content value (versus fossil based) ranging from about 15% to about 30%, and more preferably from about 17% to about 30%, inclusive, including about 17% and about 25%, as determined by ASTM-D6866-11. The "biobased content" of a material is reported as a percent value relating total renewable organic carbon to total organic carbon.

The polyurethane foams of the present disclosure are suitable for use in a number of applications, ranging from insulation (such as spray-in-insulation) to spray foam to structural panels, spray rooming, and the like. For example, low-density polyurethane foam with a core density ranging from 1.0 pcf to 3.0 pcf may be used in coolers, structural insulated panels (SIPs), insulated panels, walk in coolers, refrigerators, refrigerated truck bodies, water heaters, SPA Foam, insulated building panels, freezers, roofing panels, replacement for polyisocyanurate board, and packaging foam. Polyurethane foam of the present disclosure with a core density ranging from 1.0 pcf to 5.0 pcf may be used in one-to-one packaging foam, sprayed in place packaging, prefabricated packaging slabs, or comfort foam. Polyurethane foam of the present disclosure with a core density ranging from 0.4 pcf to 5.0 pcf can be used in the manufacture of mattresses, mattress covers, packaging, toys, furniture, office seats, car seats, car interior foam, carpet underlay, cut foam, display foam, prefabricated foam, pillows, and low density molded foam. Polyurethane foam of the present disclosure with a core density ranging from 1.5 pcf to 3.0 pcf may be used in the manufacture of molded seating, molded furniture, faux wood, picture frames, cosmetic panels for homes, toys, toilet seats, medical devices, and the like. Structural Low Density Foam, that polyurethane foam of the present disclosure with a core density ranging from 1.5 pcf to 3.0 pcf, may be used in the manufacture of doors, garage doors, car panels, automotive sound damping, automotive headliners, block filling foam, and shoe liners cushions. The polyurethane products prepared in accordance with the present disclosure may also be used to produce things like low-density adhesives these are used in the fabricated home manufacturing industry.

The following examples are included to demonstrate preferred embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

In the presently preferred general process for the production of foams in accordance with this invention, two separate mixtures are first prepared and then blended together, typically using industry standard application equipment, such as foam making equipment that blends the A-side and B-side in a 1:1 (A:B) by volume ratio. It will be understood that foam making equipment that blends the A-side and B-side in higher ratios (by volume) may also be used, such as in ratios of 1.25:1 (A:B), 1.5:1 (A:B), or 2.0:1 (A:B), by volume. The first mixture includes at least the isocyanate. The second mixture contains the natural polyol, the plasticizer/flame retardant, the catalyst(s) and water as a blowing agent. Natural polyol syrups or solutions, such as sucrose solutions, are commercially available containing varying amounts of water, up to about 90% by weight of sucrose, and ranging from about 45% to about 90% on the resin side. These syrups/solutions can be employed with or without the addition of supplemental water. Alternatively, and equally acceptable, a dry natural polyol may be taken up in the selected amount of water.

The final foaming mixture of this invention will normally contain from about 5 to 60% polyisocyanate, 0.05 to 1.0% surfactant, 5 to 30% water, 30 to 90% natural polyol (dry or in solution) such as sucrose, 0.5 to 2.5% catalyst, all by weight based on the total weight. As stated above, there may be additional additive components in the composition mixture such as flame retardants, dyes, pigments and the like. When included, the amount of flame retardants on a percent by weight basis ranges from about 5% wt. to about 30% by weight.

The desired quantities of each component in the final mix can be obtained by mixing the first mixture with the second mixture at a first to second ratio of from about 0.75:1 to 2:1 by weight, if the mixtures contain the following components in parts by weight based on the total weight of each mixture.

Example 1: Preparation of 1 pcf (lb/ft$^3$) Polyurethane Foam

The first mixture, or B-side, is the resin side. Sucrose (89%, 67.5 brix), a natural polyol (provided by Imperial Sugar Co., Sugar Land, Tex.), is mixed with approximately 5% by weight water, and formed into a solution. A surfactant (1.75 Dabco DC5604) is then added to the sucrose mixture, with stirring. Catalysts, such as the amine catalysts BL-19 (bis(2-dimethylamino ethyl)ether; available from Air Products), 3%, and Polycat 31 (4%; a low emission amine catalyst designed for low density, water blown, open cell SPF, available from Air Products), are then added with stirring, followed by an emulsifier (NP-9), and a chain linker (DEOA LF (di-ethanolamine 85% and 15% water); available from Air Products & Chemicals, Inc., Allentown, Pa., "Air Products"). Optional ingredients, such as D-400, a polyethylene oxide copolymer with 1,6-diamines, added as a gelling agent, may also be added at this point.

The second mixture, or A-side, is the isocyanate side. A blended mix of an appropriate isocyanate, such as MDI or a modified MDI (methylene diphenyl diisocyanate) with a functionality of approximately 2.3-3.0 (e.g., Lupranate® M-10 or Lupranate® M-20 [a polymeric MDI with a functionality of approximately 2.7], both available from BASF) (approximately 70 parts) and a plasticizer, TCPP [(tris (chloroisopropyl)phosphate] at a concentration of approximately 30 parts to bring the total to 100% (available from ICL-IP under the name Fyrol PCF) are stirred together.

The resin formulation, or B-side, is then reacted with the A-side at a 1-to-1 ratio with spray foam equipment running at temperatures from 100° F. to an excess of 130° F., producing a 1.0 lb/ft$^3$ (pcf) spray polyurethane foam suitable for use in residential and commercial insulation applications.

Figure 2:
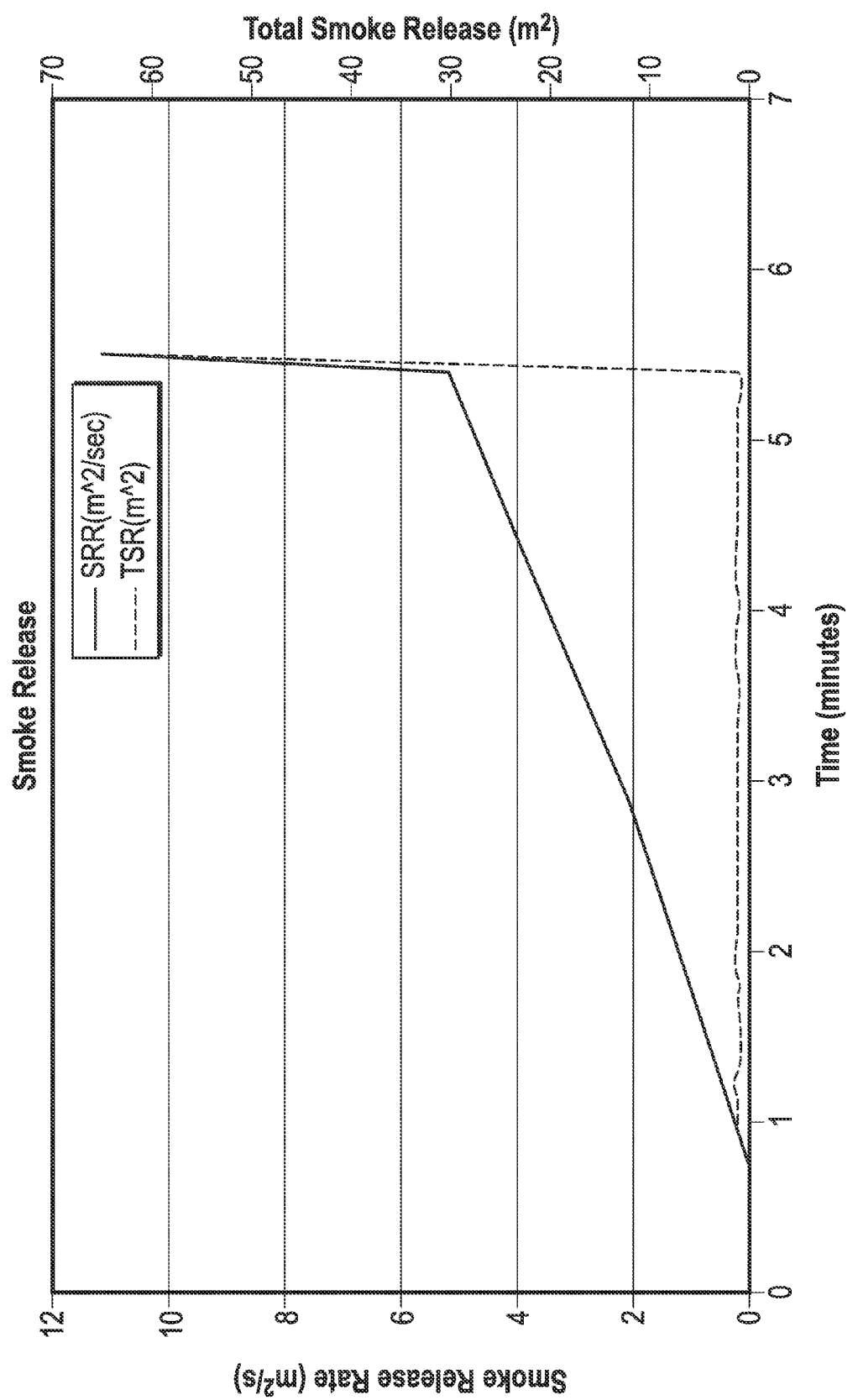
FIG. 2 illustrates a graph of the smoke release associated from a flame test on a 1 lb/ft$^3$ foam prepared in accordance with the present disclosure.
Figure 3:
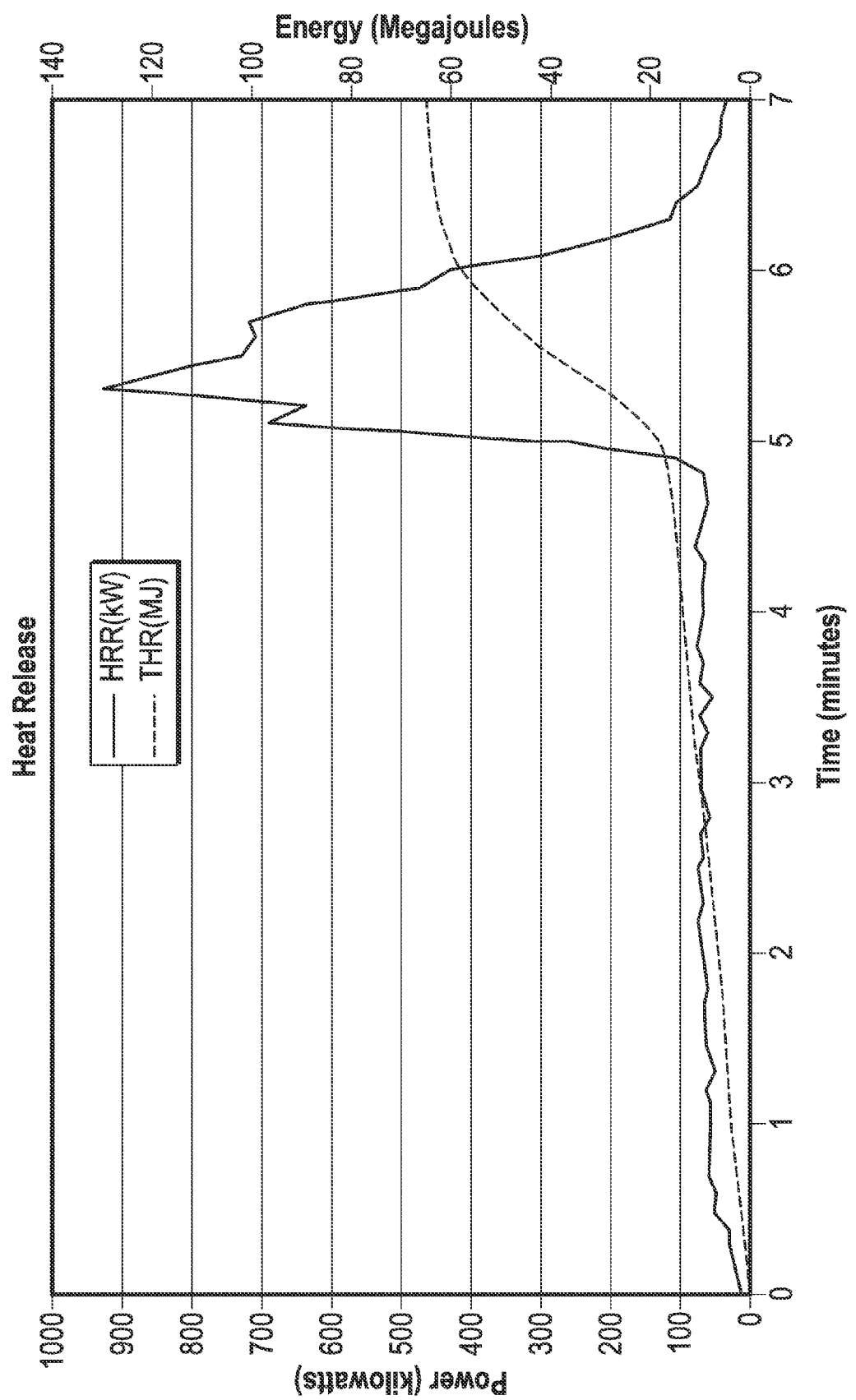
FIG. 3 illustrates a graph of the heat release associated from a flame test on a 1 lb/ft$^3$ foam prepared in accordance with the present disclosure.
Figure 4:
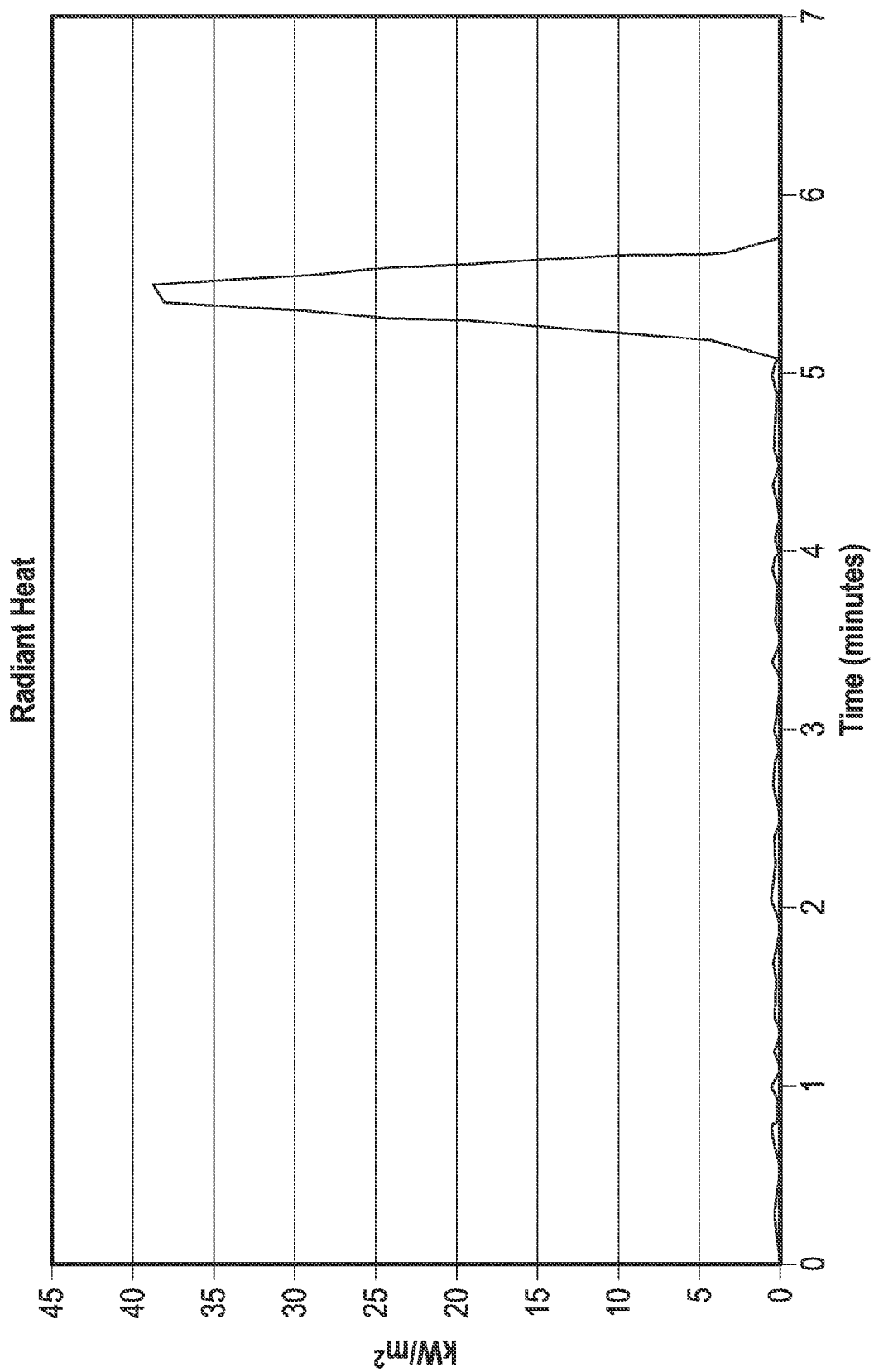
FIG. 4 illustrates a graph of the radiant heat associated from a flame test on a 1 lb/ft$^3$ foam prepared in accordance with the present disclosure.

The product foam was then tested according to ASTM testing protocols, and exhibited the ACC 377 test data as shown in FIGS. 1-4 presenting thermocouple data (FIG. 1), smoke release data (FIG. 2), heat release data (FIG. 3), and radiant heat data (FIG. 4), the total of these data acquisitions and the test exhibiting that the 1 pcf spray foam of the present disclosure may be installed in nominal thicknesses up to 10 inches and left exposed in attics and crawlspaces. The product also exhibited a mean biobased solid content, as determined by ASTM-D6866-11 Method B, of about 25%; an average apparent density (as determined by ASTM D-1622-98) of 1.02 pcf; an average tensile strength (as determined by ASTM D1623) of 3.33 psi (22.95 kPa); a flame spread (as determined by ASTM E-84) of 15 @ 4-inch spray thickness; and a smoke development value (as determined by ASTM E-84) of 400 @ 4-inch spray thickness.

Example 2: Preparation of a 0.5 pcf (lb/ft$^3$) Polyurethane Foam

The first mixture, or B-side, is the resin side. Sucrose (57 parts, 67.5 brix), a natural polyol (provided by Imperial Sugar), as either a solution or as an invert solution, is mixed with about 5% by weight water, and formed into an initial sucrose solution. A surfactant (1.75% Dabco® DC5604) is then added to the sucrose mixture, with stirring. A plasticizer/flame retardant TMCP (tris(2-monochloroisopropyl) phosphate; 27 parts) is then added, with stirring. Catalysts, such as the amine catalysts BL-19 (bis(2-dimethylamino ethyl)ether; available from Air Products), 3%, and Polycat 31 (4%; a low emission amine catalyst designed for low density, water blown, open cell SPF, available from Air Products), are then added with stirring, followed by an emulsifier (NP-9, EM-400, or the like), and a chain linker (DEOA LF (di-ethanolamine 85% and 15% water, about 3%; available from Air Products & Chemicals, Inc., Allentown, Pa., "Air Products"). Optional ingredients, such as D-400, a polyethylene oxide copolymer with 1,6-diamines, added as a gelling agent, may also be added at this point.

The second mixture, or A-side, is the isocyanate side, and is a modified MDI (methylene diphenyl diisocyanate) with a functionality of approximately 2.3 (Lupranate M-10, available from BASF) (from 70 to 100 parts), in water or an appropriate solvent or liquid.

The resin formulation, or B-side, is then reacted with the A-side at a 1 to 1 ratio with spray foam equipment running at temperatures from 100° F. to an excess of 130° F., producing a 0.5 lb/ft$^3$ (pcf) spray polyurethane foam suitable for use in residential and commercial insulation applications.

Example 3: Preparation of a Modified 0.5 pcf (lb/ft$^3$) Polyurethane Foam

B-side resin formulation: Imperial Sugar Company liquid sucrose (55 parts by total weight, 67.5 Brix), 5 parts water, 1.5 parts of Dabco® DC5604 surfactant (available from Air Products), 24 parts of a suitable plasticizer/flame retardant, such as TMCP (tris(2-monochloroisopropyl)phosphate, 3 parts of BL-19 (bis(2-dimethylamino ethyl)ether, available from Air Products) as a blowing catalyst, 0 parts Air Products Polycat® 31 (a low-emission amine catalyst design for low density, water blown, open cell SPF), 0.5 parts of diethanol amine (DEOA), a low molecular weight catalytic chain extender, 7.5 parts of 9.5 molar nonylphenol plasticizer, and 4 parts of 1,3-propane diol, a low molecular weight chain extender. All of the B-side ingredients were admixed together and prepared in a manner similar to that described in Example 2.

The A-side component is a modified MDI (methylene diphenyl diisocyanate), (100 parts), particularly Lupranate® M-10 with a functionality of approximately 2.3, or Lupranate® M-20 with a functionality of approximately 2.7 (both available from BASF).

The B-side composition was contacted with the A-side in a 1-to-1 weight ratio with spray foam equipment running at temperatures from 100° F. to an excess of 130° F., producing a 0.5 lb/ft$^3$ density, sprayed polyurethane foam suitable for use in residential and commercial insulation applications, passing industry standard flame resistance and insulative properties tests. The reduction in reaction catalyst (removal of the Polycat® 31 and addition of the 1,3-propane diol) effectively increased the gelation time by approximately 2 seconds, and improved the flow characteristics of the polymerizing foam, resulting in improved wall board adhesion and multi-layering adhesion of the finished product as compared to example #2 above.

Example 4: Preparation of a Modified 0.5 pcf (lb/ft$^3$) Polyurethane Foam from Sucrose with the Use of a High-Molecular Weight Plasticizer and Reduced Catalyst Load B-side resin formulation: Imperial Sugar Company liquid sucrose (55 parts by total weight, 67.5 Brix), 5 parts water, 1.5 parts of Dabco® DC5604 surfactant (available from Air Products), 24 parts of the plasticizer/flame retardant TMCP (tris(2-monochloroisopropyl)phosphate), 3 parts of Dabco® BL-19 (bis(2-dimethylamino ethyl)ether, available from Air Products & Chemicals, Inc., Allentown, Pa., "Air Products") as a blowing catalyst, 0 parts Air Products Polycat® 31 (a low-emission amine catalyst design for low density, water blown, open cell SPF), 0.5 parts of diethanol amine (DEOA), a low molecular weight catalytic chain extender, 7.5 parts of 12 molar nonylphenol plasticizer, and 4 parts of 1,3-propane diol, a low molecular weight chain extender. All of the B-side ingredients were admixed together and prepared in a manner similar to that described in Example 2.

The A-side component is a modified MDI (methylene diphenyl diisocyanate), (100 parts), particularly Lupranate® M-10 with a functionality of approximately 2.3, or Lupranate® M-20 with a functionality of approximately 2.7 (both available from BASF).

The B-side composition was contacted with the A-side in a 1-to-1 weight ratio with spray foam equipment running at temperatures from 100° F. to an excess of 130° F., producing a 0.5 lb/ft$^3$ density, sprayed polyurethane foam suitable for use in residential and commercial insulation applications, passing industry standard flame resistance and insulative properties tests. The reduction in reaction catalyst (removal of the Polycat® 31) and addition of a higher molecular weight plasticizer (12-mole nonylphenol) effectively increased the gelation time by approximately 5 seconds, and improved the flow characteristics and tackiness of the polymerizing foam, resulting in improved wall board adhesion and multi-layering adhesion of the finished product as compared to example #3 above.

Example 5: Preparation of a Modified 0.5 pcf (lb/ft$^3$) Polyurethane Foam from Sucrose with the Use of an Emulsifier/Plasticizer B-side resin formulation: Imperial Sugar Company liquid sucrose (58.5 parts by total weight, 67.5 Brix), 5 parts water, 1.0 parts of Dabco® DC5604 surfactant (available from Air Products), 27.5 parts of the plasticizer/flame retardant TMCP (tris(2-monochloroisopropyl)phosphate), 3.5 parts of Polycat® 31 (a low-emission amine catalyst designed for low density, water blown, open cell SPF, available from Air Products), 2.5 parts of Polycat®-140, and 1.0 parts Polycat®-141 blowing catalysts, 1.0 parts of Dabco® 5350 surfactant, 6.0 parts of BM-400 emulsifier (BASF Corp., Wyandotte, Mich.), and 0.5 parts of diethanol amine (DEOA), a low molecular weight catalytic chain extender. All of the B-side ingredients were admixed together and prepared in a manner similar to that described in Example 2.

The A-side component is a modified MDI (methylene diphenyl diisocyanate), (100 parts), particularly Lupranate® M-10 with a functionality of approximately 2.3, or Lupranate® M-20 with a functionality of approximately 2.7 (both available from BASF).

The B-side composition was contacted with the A-side in a 1-to-1 weight ratio with spray foam equipment running at temperatures from 100° F. to an excess of 130° F., producing a 0.5 lb/ft$^3$ density, sprayed polyurethane foam suitable for use in residential and commercial insulation applications, passing industry standard flame resistance and insulative properties tests. The addition of the BASF BM-400 effectively emulsified the B-side resin, producing a more homogeneous mixture. The BM-400 also performed as a plasticizer in the foam forming process, improving the flow characteristics and tackiness of the polymerizing foam, thereby improving wall board adhesion and multi-layering adhesion of the finished product as compared to example #4 above.

Figure 5:
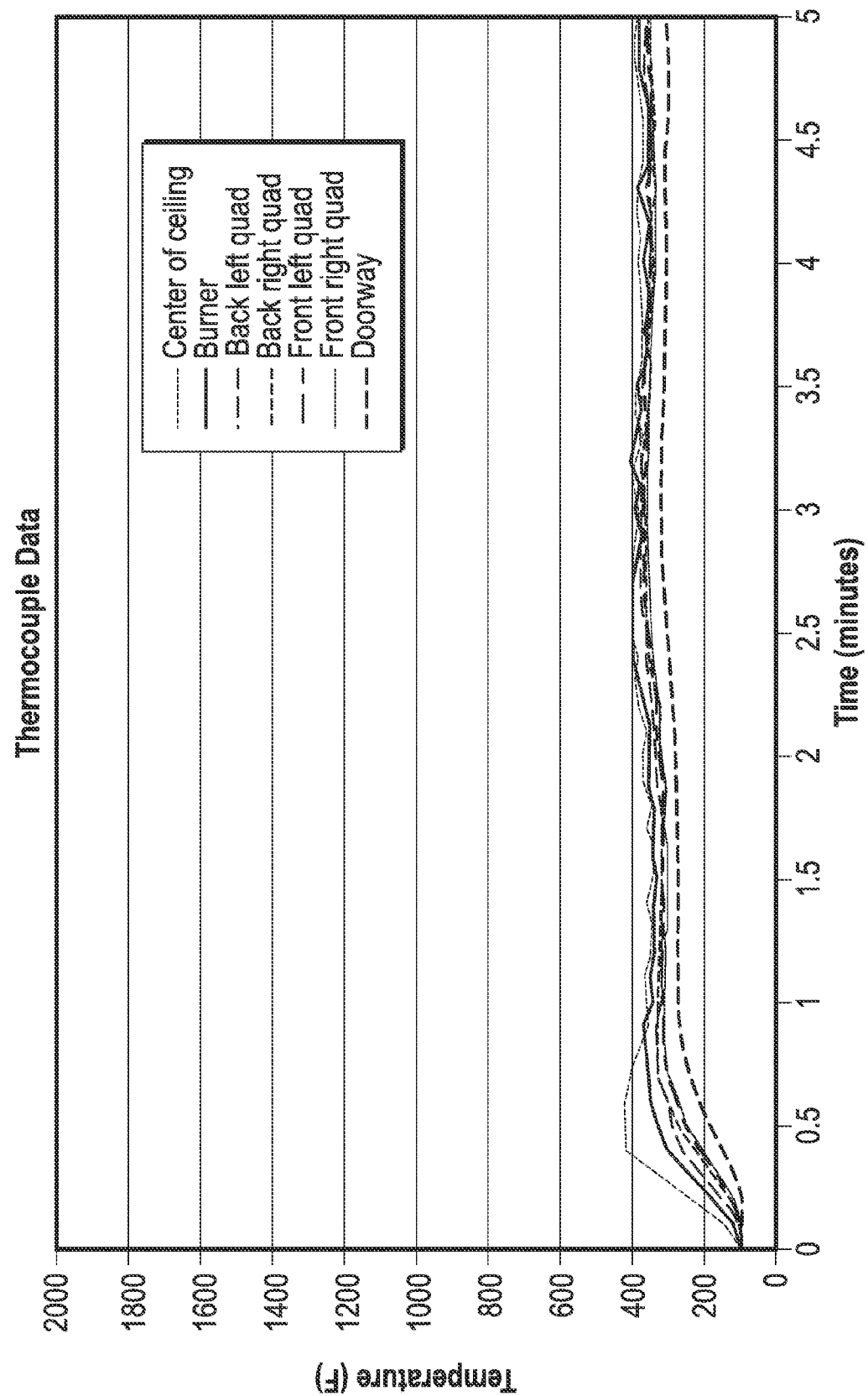
FIG. 5 illustrates a graph of exemplary thermocouple data from an ICC-ES AC377 flame test on a 0.5 lb/ft$^3$ foam prepared in accordance which the present disclosure.
Figure 6:
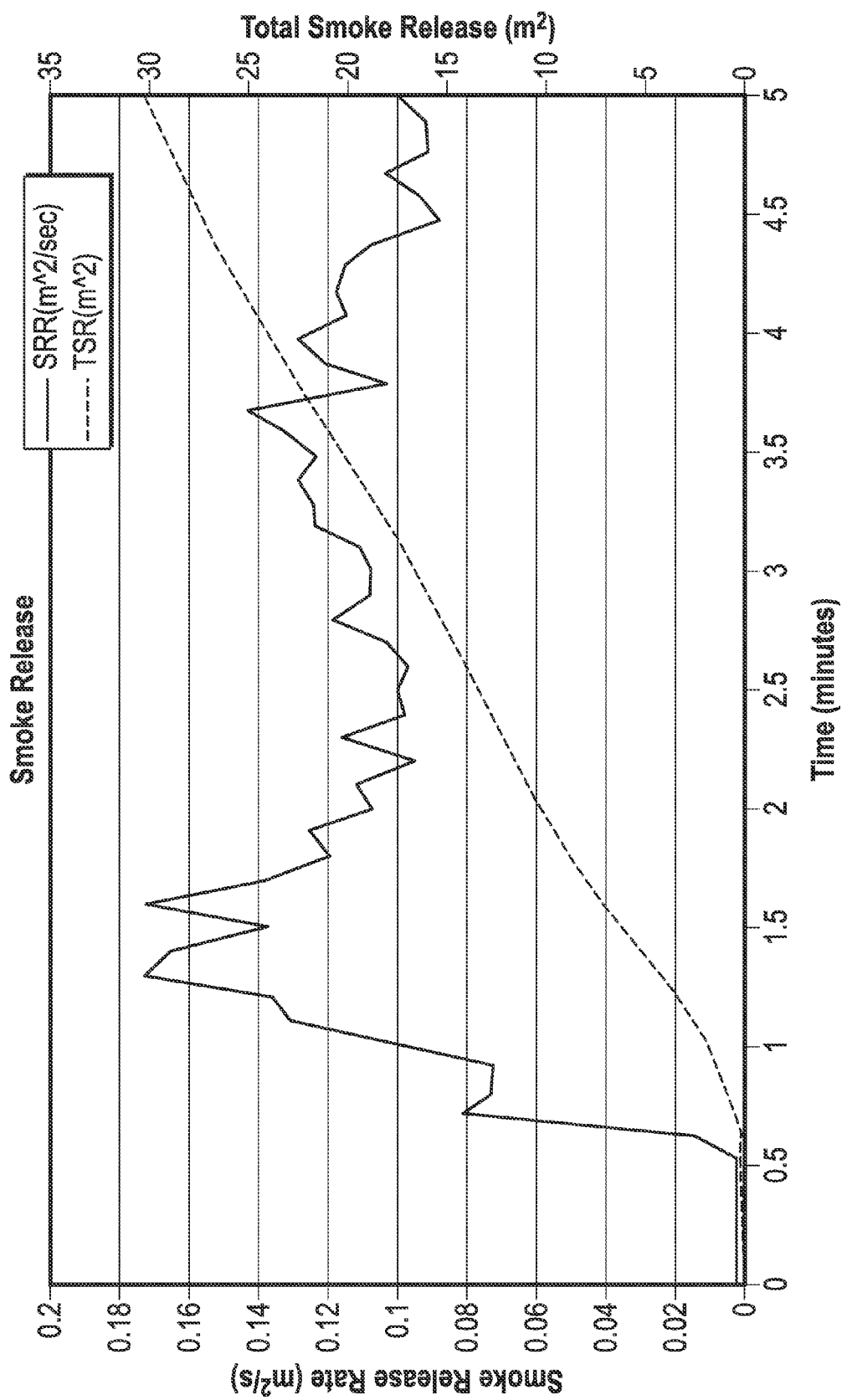
FIG. 6 illustrates a graph of the smoke release associated from a flame test on a 0.5 lb/ft$^3$ foam prepared in accordance with the present disclosure.
Figure 7:
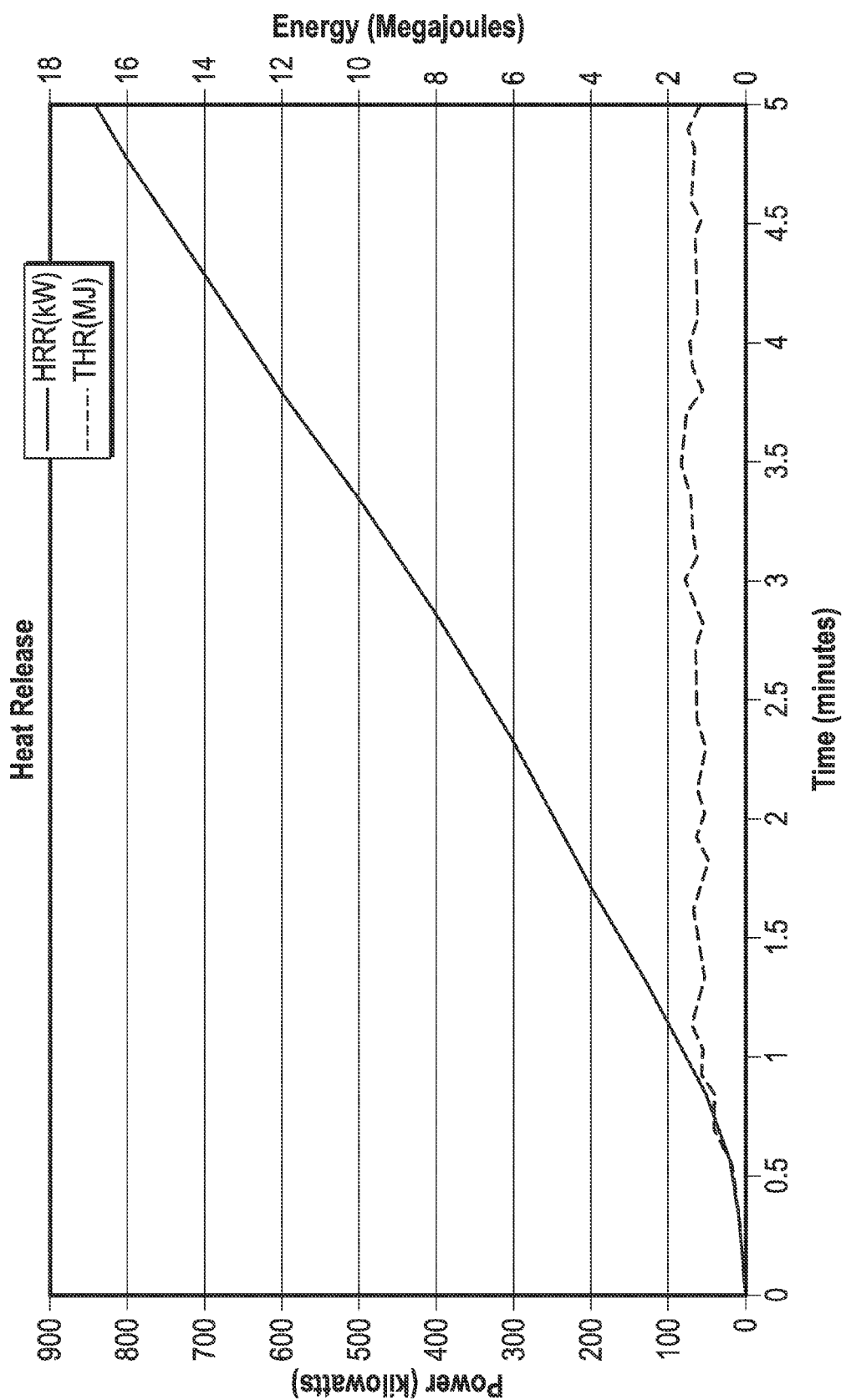
FIG. 7 illustrates a graph of the heat release associated from a flame test on a 0.5 lb/ft$^3$ foam prepared in accordance with the present disclosure.
Figure 8:
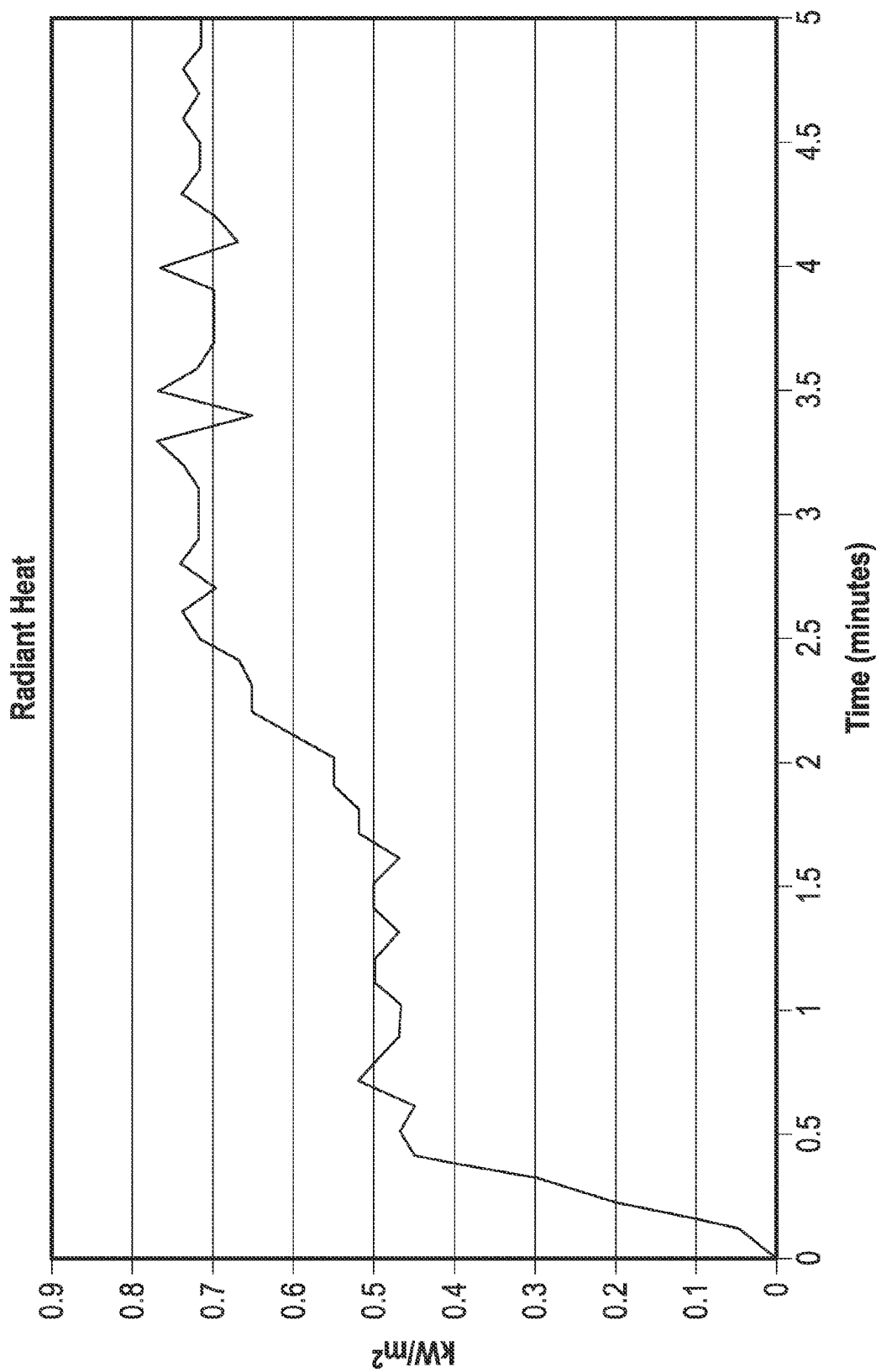
FIG. 8 illustrates a graph of the radiant heat associated from a flame test on a 0.5 lb/ft$^3$ foam prepared in accordance which the present disclosure.

The product foam was then tested according to ASTM testing protocols, and exhibited the ACC 377 test data as shown in FIGS. 5-8, presenting thermocouple data (FIG. 5), smoke release data (FIG. 6), heat release data (FIG. 7), and radiant heat data (FIG. 8), the total of these data acquisitions and the test exhibiting that the 0.5 pcf spray foam product of the present disclosure may be installed in nominal thicknesses up to 10 inches and left exposed in attics and crawlspaces. The product also exhibited a mean biobased solid content, as determined by ASTM-D6866-11 Method B, of about 17%; an average apparent density (as determined by ASTM D-1622-98) of 0.5 pcf; an average tensile strength (as determined by ASTM D1623) of 6.5 psi (44.8 kPa); a flame spread (as determined by ASTM E-84) of 5© 4-inch spray thickness; and a smoke development value (as determined by ASTM E-84) of 450© 4-inch spray thickness.

Example 6: Preparation of a 0.5 pcf (lb/ft$^3$) Polyurethane Foam from Sugar Invert (Glucose and Fructose)

B-side resin formulation: Imperial Sugar Company liquid invert (glucose and fructose, 55 parts by total weight, 72 Brix), 5 parts water, 1.5 parts of Dabco® DC5604 surfactant, 25 parts of the plasticizer/flame retardant TMCP (tris (2-monochloroisopropyl)phosphate), 3 parts of Dabco® BL-19 (bis(2-dimethylamino ethyl)ether, available from Air Products) as a blowing catalyst, 0.5 parts of diethanol amine (DEOA), a low molecular weight catalytic chain extender, 7.5 parts of 12 molar nonylphenol plasticizer, and 2.7 parts of BASF BM-400 emulsifier were combined. All of the B-side ingredients were admixed together and prepared in a manner similar to that described in Example 2.

The A-side component is a modified MDI (methylene diphenyl diisocyanate), (100 parts), particularly Lupranate® M-10 with a functionality of approximately 2.3, or Lupranate® M-20 with a functionality of approximately 2.7 (both available from BASF).

The B-side composition was contacted with the A-side in a 1-to-1 weight ratio with spray foam equipment running at temperatures from 100° F. to an excess of 130° F., producing a 0.5 lb/ft$^3$ density, sprayed polyurethane foam suitable for use in residential and commercial insulation applications, passing industry standard flame resistance and insulative properties tests.

Example 7: Preparation of a 0.5 pcf (lb/ft$^3$) Polyurethane Foam from Sugar Cane Molasses B-side resin formulation: Imperial Sugar Company cane molasses (55 parts by total weight, 82 Brix), 5 parts water, 1.3 parts of Dabco® DC5604 surfactant, 25 parts of the plasticizer/flame retardant TMCP (tris(2-monochloroisopropyl)phosphate), 3 parts Dabco® BL-19 (bis(2-dimethylamino ethyl)ether, available from Air Products) as a blowing catalyst, 0.5 parts of diethanol amine (DEOA), a low molecular weight catalytic chain extender, 7.5 parts of 12 molar nonylphenol plasticizer, and 2.7 parts of BASF BM-400 emulsifier were combined. All of the B-side ingredients were admixed together and prepared in a manner similar to that described in Example 2.

The A-side component is a modified MDI (methylene diphenyl diisocyanate), (100 parts), particularly Lupranate® M-10 with a functionality of approximately 2.3, or Lupranate® M-20 with a functionality of approximately 2.7 (both available from BASF).

The B-side composition was contacted with the A-side in a 1-to-1 weight ratio with spray foam equipment running at temperatures from 100° F. to an excess of 130° F., producing a 0.5 lb/ft$^3$ density, sprayed polyurethane foam suitable for use in residential and commercial insulation applications, passing industry standard flame resistance and insulative properties tests.

Example 8: Preparation of a 0.5 pcf (lb/ft$^3$) Polyurethane Foam from Corn Syrup B-side resin formulation: Archer Daniels Midland Corporation (ADM) corn syrup (55 parts by total weight, 75 Brix), 5 parts water, 1.3 parts of Dabco® DC5604 surfactant, 25 parts of the plasticizer/flame retardant TMCP (tris (2-monochloroisopropyl)phosphate), 3 parts of Dabco® BL-19 (bis(2-dimethylamino ethyl)ether, available from Air Products) as a blowing catalyst, 0.5 parts of diethanol amine (DEOA), a low molecular weight catalytic chain extender, 7.5 parts of 12 molar nonylphenol plasticizer, and 2.7 parts of BASF BM-400 emulsifier were combined, such that the total ingredients add up to 100 parts by weight. All of the B-side ingredients were admixed together and prepared in a manner similar to that described in Example 2.

The A-side component is a modified MDI (methylene diphenyl diisocyanate), (100 parts), particularly Lupranate® M-10 with a functionality of approximately 2.3, or Lupranate® M-20 with a functionality of approximately 2.7 (both available from BASF).

The B-side composition was contacted with the A-side in a 1-to-1 weight ratio with spray foam equipment running at temperatures from 100° F. to an excess of 130° F., producing a 0.5 lb/ft$^3$ density, sprayed polyurethane foam suitable for use in residential and commercial insulation applications, passing industry standard flame resistance and insulative properties tests.

FIG. 9 illustrates a table of comparative physical properties of both exemplary 0.5 lb/ft$^3$ and 1.0 lb/ft$^3$ polyurethane foams prepared in accordance with the present disclosure, as well as with several commercially available polyurethane foams that are marketed as environmentally friendly. This table shows that the polyurethane foam compositions of the present disclosure perform at least as good as, if not better than, products currently in the market, but made with different components. In particular, these products do not use naturally-occurring polyols as their major hydroxyl component in the foam formulation.

Example 9: Preparation of a 1.5 pcf (lb/t$^3$) Polyurethane Foam from Sucrose Using Non-Halogenated Flame Retardants B-side resin formulation: Imperial Sugar Company liquid sucrose (58.5 parts by total weight, 67.5 Brix), 2 parts water, 95.5 parts of PLURACOL® 945 polyol (available from BASF), plasticizer/non-halogenated flame retardant TEP (triethyl phosphate) or Al(OH)$_3$ in amounts of 5%, 10%, 15% and 20% by weight of the resin component, 0.2 parts of DABCO® BL-19 (a low-emission tertiary amine catalyst designed for low density, water blown, open cell SPF, available from Air Products), and 2 parts of Niax L-6189, a silicone stabilizing compound. All of the B-side ingredients were admixed together and prepared in a manner similar to that described in Example 2.

The A-side component is a modified MDI (methylene diphenyl diisocyanate), (50 parts), particularly Lupranate® M-20 with a functionality of approximately 2.7 (available from BASF).

The B-side composition was contacted with the A-side in a 1-to-1 weight ratio with spray foam equipment running at temperatures from 100° F. to an excess of 130° F., producing a 1.5 lb/ft$^3$ density, sprayed polyurethane foam suitable for use in residential and commercial insulation applications.

These examples were conducted to evaluate the point at which, using non-halogenated fire retardants with sucrose in generating an MDI-based flexible polyurethane foam, the foam product material becomes self-extinguishing after application of a propane torch. The point varied, depending upon the amount and type of non-halogenated fire retardant (FR) used. In particular, when TEP was used as the non-halogenated FR, at 15% TEP/Sucrose the polyurethane foam became self-extinguishing. When Al(OH)$_3$ was used as the non-halogenated FR, the material became self-extinguishing at 20% Al(OH)$_3$/Sucrose.

Other and further embodiments utilizing one or more aspects of the inventions described above can be devised without departing from the spirit of Applicant's invention. For example, the polyurethane foams may further include the addition of colorants or dyes, for company identification purposes during use, as appropriate, provided that the colorants or dyes do not inhibit the formation of the foam. Further, the various methods and embodiments of the manufacturing process can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, inter-lineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A flame-retardant polyurethane foam comprising the reaction product of:
    a first reaction mixture consisting of at least one polyisocyanate and optionally a surfactant; and
    a second reaction mixture consisting of:
        a natural polyol wherein substantially all of the hydroxyl groups on the polyol are free;
        a non-halogenated inorganic hydrate or inorganic hydroxide flame retardant;
        a surfactant;
        an aqueous blowing agent;
        a polyurethane producing catalyst; and
        optionally, any one or any combination of a plasticizer, an emulsifier, a biocide, a bacteriostat, a polyether polyol, a halogenated or non-halogen containing blowing agent, a filler, a dye or colorant, an anti-scorching agent, glycerine, a chain extender/crosslinker, an antioxidant, an antistatic agent, and/or a cell-opening agent;
    wherein the first reaction mixture and the second reaction mixture are used in amounts to provide an Isocyanate Index of 20 to 50.

2. The polyurethane foam according to claim 1, wherein the natural polyol is selected from the group consisting of sucrose, fructose, glucose, xylose, corn syrup, dextrose, and molasses.

3. The polyurethane foam according to claim 1, wherein the non-halogenated flame retardant is an aluminum, barium, calcium, copper, iron, magnesium, nickel, or zinc hydroxide or hydrate.

4. The polyurethane foam according to claim 1, having a density ranging from about 0.3 lb/ft$^3$ to about 5.0 lb/ft$^3$, and exhibiting a percent modern carbon (pMC) value of ranging from about 10% to about 50% as determined by ASTM-D6866-11.

5. The polyurethane foam according to claim 1, wherein the foam product has a bio-based content ranging from about 15% to about 30%, as determined by ASTM D6866-11.

6. The flame-retardant polyurethane foam according to claim 1, wherein the polyurethane foam meets or exceeds the conditions of acceptance of the ICC-ES AC377 Appendix X specification.

7. A method of making a flame-retardant polyurethane foam comprising:
    a. providing a first aqueous solution consisting of:
        an untreated natural polyol in which substantially all of the hydroxyl groups are free,
        a surfactant,
        polyurethane forming catalysts,
        optionally, a non-halogenated inorganic hydrate or inorganic hydroxide flame retardant,
        optionally, a plasticizer,
        optionally, an emulsifier,
        optionally, any one of more of a halogenated or non-halogen containing blowing agent, a biocide, a bacteriostat, a polyether polyol, a filler, a colorant, an anti-scorching agent, a chain extender/cross-linker, an antioxidant, an antistatic agent, and/or a cell-opening agent,
        and water,
    b. combining the first aqueous solution mixture and a second solution consisting of:
        a polyisocyanate,
        optionally, a non-halogenated inorganic hydrate or inorganic hydroxide flame retardant, and
        optionally, a plasticizer; and
    c. allowing the mixture to foam;
        wherein one or both of the first aqueous solution and the second solution includes the non-halogenated inorganic hydrate or inorganic hydroxide flame retardant, and one or both of the first aqueous solution and the second solution includes the plasticizer; and
        wherein the first aqueous solution and the second solution are used in amounts to provide an Isocyanate Index of 20 to 50.

8. The method of claim 7, wherein the plasticizer is added to both the first aqueous solution and the second solution.

9. The method of claim 7, wherein the flame-retardant polyurethane foam meets or exceeds the conditions of acceptance of the ICC-ES AC377 Appendix X specification.

10. A method for preparing a water-blown, low density, polyurethane foam, the method which comprises:
    contacting a first reaction mixture consisting of at least one polyisocyanate with a second reaction mixture consisting of at least one natural polyol, a blowing agent composition consisting of at least 0.1 wt % water, an effective amount of a gelling catalyst, a non-halogenated inorganic hydrate or inorganic hydroxide flame retardant, and optionally one of more of a chain extender, an emulsifier, an inorganic compound, a filler, a colorant, an anti-scorching agent, and/or glycerine,
    wherein contacting occurs for a period of time sufficient to produce a polyurethane foam, the foam having a density of 0.3 lb/ft$^3$ to 1 lb/ft$^3$; and
    wherein the first reaction mixture and the second reaction mixture are contacted in an amount sufficient to provide an Isocyanate Index of 20 to 50.

11. The method of claim 10, wherein the halogenated or non-halogen containing blowing agent is a hydrofluorocarbon, hydrofluoro(chloro)olefin, or hydrocarbon blowing agent.

12. The method of claim 10, wherein the at least one natural polyol is selected from the group consisting of sucrose, corn syrup, dextrose, fructose, glucose, molasses, and combinations thereof.

13. The method of claim 10, wherein the water-blown, low density, polyurethane foam meets or exceeds the conditions of acceptance of the ICC-ES AC377 Appendix X specification.

14. A flame-retardant polyurethane foam comprising the reaction product of:
    a first reaction mixture consisting of at least one polyisocyanate; and
    a second reaction mixture consisting of:
        a natural polyol wherein substantially all of the hydroxyl groups on the polyol are free;
        a non-halogenated inorganic hydrate or inorganic hydroxide flame retardant;
        a surfactant;
        an aqueous blowing agent;
        a polyurethane producing catalyst;
        a chain extender; and
        a plasticizer;
    wherein the first reaction mixture and the second reaction mixture are used in amounts to provide an Isocyanate Index of 20 to 50.

15. The polyurethane foam according to claim 14, wherein:
    the natural polyol is present in the second reaction mixture at about 20-70 wt %;
    the non-halogenated inorganic hydrate or inorganic hydroxide flame retardant is present in the second reaction mixture at about 5-40 wt %;
    the surfactant is present in the second reaction mixture at about 1.0-5 wt %;
    the aqueous blowing agent is present in the second reaction mixture at about 0.05-10 wt %;
    the polyurethane producing catalyst is present in the second reaction mixture at about 0.01-10 wt %;
    the chain extender is present in the second reaction mixture at about 0.5-5 wt %; and
    the plasticizer is present in the second reaction mixture at about 0.01-15 wt %.

* * * * *